US012204336B2

(12) United States Patent
Sorin et al.

(10) Patent No.: US 12,204,336 B2
(45) Date of Patent: Jan. 21, 2025

(54) APPARATUS, METHOD AND ARTICLE TO FACILITATE MOTION PLANNING IN AN ENVIRONMENT HAVING DYNAMIC OBJECTS

(71) Applicants: DUKE UNIVERSITY, Durham, NC (US); BROWN UNIVERSITY, Providence, RI (US)

(72) Inventors: Daniel Sorin, Durham, NC (US); William Floyd-Jones, Durham, NC (US); Sean Murray, Durham, NC (US); George Konidaris, Providence, RI (US); William Walker, Durham, NC (US)

(73) Assignees: DUKE UNIVERSITY, Durham, NC (US); BROWN UNIVERSITY, Providence, RI (US)

( * ) Notice: Subject to any disclaimer, the term of this patent is extended or adjusted under 35 U.S.C. 154(b) by 614 days.

(21) Appl. No.: 17/299,574

(22) PCT Filed: Dec. 4, 2019

(86) PCT No.: PCT/US2019/064511
§ 371 (c)(1),
(2) Date: Jun. 3, 2021

(87) PCT Pub. No.: WO2020/117958
PCT Pub. Date: Jun. 11, 2020

(65) Prior Publication Data
US 2022/0057803 A1    Feb. 24, 2022

Related U.S. Application Data

(60) Provisional application No. 62/775,257, filed on Dec. 4, 2018.

(51) Int. Cl.
*G05D 1/00* (2024.01)
(52) U.S. Cl.
CPC ......... *G05D 1/0217* (2013.01); *G05D 1/0088* (2013.01); *G05D 1/0214* (2013.01); *G05D 1/0219* (2013.01)
(58) Field of Classification Search
CPC ............... G05D 1/0217; G05D 1/0088; G05D 1/0214
See application file for complete search history.

(56) References Cited

U.S. PATENT DOCUMENTS 4,163,183 A    7/1979    Engelberger et al.
4,300,198 A    11/1981   Davini
(Continued)

FOREIGN PATENT DOCUMENTS

CN    101837591 A    9/2010
CN    102186638 A    9/2011
(Continued)

OTHER PUBLICATIONS

Extended European Search Report issued in European Application No. 19893874.8, mailed Jan. 5, 2022, 13 bages.
(Continued)

*Primary Examiner* — James M McPherson
*Assistant Examiner* — Kyle J Kingsland
(74) *Attorney, Agent, or Firm* — Talem IP Law, LLP

(57) ABSTRACT

A motion planner of a computer system of a primary agent, e.g., an autonomous vehicle, uses reconfigurable collision detection architecture hardware to perform a collision assessment on a planning graph for the primary agent prior to execution of a motion plan. For edges on the planning graph, which represent transitions in states of the primary agent, the system sets a probability of collision with another agent, e.g., a dynamic object, in the environment based at least in part on the collision assessment. Depending on
(Continued)

whether the goal of the primary agent is to avoid or collide with a particular dynamic object in the environment, the system then performs an optimization to identify a path in the resulting planning graph with either a relatively low or relatively high potential of a collision with the particular dynamic object. The system then causes the actuator system of the primary agent to implement a motion plan with the applicable identified path based at least in part on the optimization.

29 Claims, 16 Drawing Sheets

(56) References Cited

U.S. PATENT DOCUMENTS

| | | |
|---|---|---|
| 4,862,373 A | 8/1989 | Meng |
| 4,949,277 A | 8/1990 | Trovato et al. |
| 5,347,459 A | 9/1994 | Greenspan et al. |
| 5,544,282 A | 8/1996 | Chen et al. |
| 5,795,297 A | 8/1998 | Daigle |
| 6,004,016 A | 12/1999 | Spector |
| 6,049,756 A | 4/2000 | Libby |
| 6,089,742 A | 7/2000 | Warmerdam et al. |
| 6,259,988 B1 | 7/2001 | Galkowski et al. |
| 6,470,301 B1 | 10/2002 | Barral |
| 6,493,607 B1 | 12/2002 | Bourne et al. |
| 6,526,372 B1 | 2/2003 | Orschel et al. |
| 6,526,373 B1 | 2/2003 | Barral |
| 6,529,852 B2 | 3/2003 | Knoll et al. |
| 6,539,294 B1 | 3/2003 | Kageyama |
| 6,629,037 B1 | 9/2003 | Nyland |
| 6,671,582 B1 | 12/2003 | Hanley |
| 7,577,498 B2 | 8/2009 | Jennings et al. |
| 7,609,020 B2 | 10/2009 | Kniss et al. |
| 7,865,277 B1 | 1/2011 | Larson et al. |
| 7,940,023 B2 | 5/2011 | Kniss et al. |
| 8,082,064 B2 | 12/2011 | Kay |
| 8,315,738 B2 | 11/2012 | Chang et al. |
| 8,571,706 B2 | 10/2013 | Zhang et al. |
| 8,666,548 B2 | 3/2014 | Lim |
| 8,825,207 B2 | 9/2014 | Kim et al. |
| 8,825,208 B1 | 9/2014 | Benson |
| 8,855,812 B2 | 10/2014 | Kapoor |
| 8,880,216 B2 | 11/2014 | Izumi et al. |
| 8,972,057 B1 | 3/2015 | Freeman et al. |
| 9,092,698 B2 | 7/2015 | Buehler et al. |
| 9,102,055 B1 | 8/2015 | Konolige et al. |
| 9,227,322 B2 | 1/2016 | Graca et al. |
| 9,280,899 B2 | 3/2016 | Biess et al. |
| 9,327,397 B1 | 5/2016 | Williams et al. |
| 9,333,044 B2 | 5/2016 | Olson |
| 9,434,072 B2 | 9/2016 | Buehler et al. |
| 9,475,192 B2 | 10/2016 | Liang et al. |
| 9,539,058 B2 | 1/2017 | Tsekos et al. |
| 9,632,502 B1 | 4/2017 | Levinson et al. |
| 9,645,577 B1 | 5/2017 | Frazzoli et al. |
| 9,687,982 B1 | 6/2017 | Jules et al. |
| 9,687,983 B1 | 6/2017 | Prats |
| 9,701,015 B2 | 7/2017 | Buehler et al. |
| 9,707,682 B1 | 7/2017 | Konolige et al. |
| 9,731,724 B2 | 8/2017 | Yoon |
| 9,981,382 B1 | 5/2018 | Strauss et al. |
| 9,981,383 B1 | 5/2018 | Nagarajan |
| 9,993,923 B2 | 6/2018 | Terada |
| 10,035,266 B1 | 7/2018 | Kroeger |
| 10,099,372 B2 | 10/2018 | Vu et al. |
| 10,124,488 B2 | 11/2018 | Lee et al. |
| 10,131,053 B1 | 11/2018 | Sampedro et al. |
| 10,300,605 B2 | 5/2019 | Sato |
| 10,303,180 B1 | 5/2019 | Prats |
| 10,430,641 B2 | 10/2019 | Gao |
| 10,705,528 B2 | 7/2020 | Wierzynski et al. |
| 10,723,024 B2 | 7/2020 | Konidaris et al. |
| 10,782,694 B2 | 9/2020 | Zhang et al. |
| 10,792,114 B2 | 10/2020 | Hashimoto et al. |
| 10,959,795 B2 | 3/2021 | Hashimoto et al. |
| 11,213,945 B2 | 1/2022 | Kuwahara et al. |
| 11,358,337 B2 | 6/2022 | Czinger et al. |
| 11,623,494 B1 | 4/2023 | Amicar et al. |
| 2002/0013675 A1 | 1/2002 | Knoll et al. |
| 2002/0074964 A1 | 6/2002 | Quaschner et al. |
| 2003/0155881 A1 | 8/2003 | Hamann et al. |
| 2004/0249509 A1 | 12/2004 | Rogers et al. |
| 2005/0071048 A1 | 3/2005 | Watanabe et al. |
| 2005/0216181 A1 | 9/2005 | Estkowski et al. |
| 2006/0235610 A1 | 10/2006 | Ariyur et al. |
| 2006/0247852 A1 | 11/2006 | Kortge et al. |
| 2007/0106422 A1 | 5/2007 | Jennings et al. |
| 2007/0112700 A1 | 5/2007 | Den Haan et al. |
| 2008/0012517 A1 | 1/2008 | Kniss et al. |
| 2008/0114492 A1 | 5/2008 | Miegel et al. |
| 2008/0125893 A1 | 5/2008 | Tilove et al. |
| 2008/0186312 A1 | 8/2008 | Ahn et al. |
| 2008/0234864 A1 | 9/2008 | Sugiura et al. |
| 2009/0055024 A1 | 2/2009 | Kay |
| 2009/0192710 A1 | 7/2009 | Eidehall et al. |
| 2009/0234499 A1 | 9/2009 | Nielsen et al. |
| 2009/0295323 A1 | 12/2009 | Papiernik et al. |
| 2009/0326711 A1 | 12/2009 | Chang et al. |
| 2009/0326876 A1 | 12/2009 | Miller |
| 2010/0145516 A1 | 6/2010 | Cedoz et al. |
| 2010/0235033 A1 | 9/2010 | Yamamoto et al. |
| 2011/0036188 A1 | 2/2011 | Fujioka et al. |
| 2011/0066282 A1 | 3/2011 | Bosscher et al. |
| 2011/0153080 A1 | 6/2011 | Shapiro et al. |
| 2011/0211938 A1 | 9/2011 | Eakins et al. |
| 2011/0264111 A1 | 10/2011 | Nowlin et al. |
| 2012/0010772 A1 | 1/2012 | Pack et al. |
| 2012/0083964 A1 | 4/2012 | Montemerlo et al. |
| 2012/0215351 A1 | 8/2012 | McGee et al. |
| 2012/0297733 A1 | 11/2012 | Pierson et al. |
| 2012/0323357 A1 | 12/2012 | Izumi et al. |
| 2013/0076866 A1 | 3/2013 | Drinkard et al. |
| 2013/0346348 A1 | 12/2013 | Buehler et al. |
| 2014/0012419 A1 | 1/2014 | Nakajima |
| 2014/0025201 A1 | 1/2014 | Ryu et al. |
| 2014/0025203 A1 | 1/2014 | Inazumi |
| 2014/0058406 A1 | 2/2014 | Tsekos |
| 2014/0067121 A1 | 3/2014 | Brooks et al. |
| 2014/0079524 A1 | 3/2014 | Shimono et al. |
| 2014/0121833 A1 | 5/2014 | Lee et al. |
| 2014/0121837 A1 | 5/2014 | Hashiguchi et al. |
| 2014/0147240 A1 | 5/2014 | Noda et al. |
| 2014/0156068 A1 | 6/2014 | Graca et al. |
| 2014/0249741 A1 | 9/2014 | Levien et al. |
| 2014/0251702 A1 | 9/2014 | Berger et al. |
| 2014/0277718 A1 | 9/2014 | Izhikevich et al. |
| 2014/0309916 A1 | 10/2014 | Bushnell |
| 2015/0005785 A1 | 1/2015 | Olson |
| 2015/0037131 A1 | 2/2015 | Girtman et al. |
| 2015/0051783 A1 | 2/2015 | Tamir et al. |
| 2015/0134111 A1 | 5/2015 | Nakajima |
| 2015/0239127 A1 | 8/2015 | Barajas et al. |
| 2015/0261899 A1 | 9/2015 | Atohira et al. |
| 2015/0266182 A1 | 9/2015 | Strandberg |
| 2015/0273685 A1 | 10/2015 | Linnell et al. |
| 2016/0001775 A1 | 1/2016 | Wilhelm et al. |
| 2016/0008078 A1 | 1/2016 | Azizian et al. |
| 2016/0016315 A1 | 1/2016 | Kuffner, Jr. et al. |
| 2016/0107313 A1 | 4/2016 | Hoffmann et al. |
| 2016/0112694 A1 | 4/2016 | Nishi et al. |
| 2016/0121486 A1 | 5/2016 | Lipinski et al. |
| 2016/0121487 A1 | 5/2016 | Mohan et al. |
| 2016/0154408 A1 | 6/2016 | Eade et al. |
| 2016/0161257 A1 | 6/2016 | Simpson et al. |
| 2016/0299507 A1 | 10/2016 | Shah et al. |
| 2016/0324587 A1 | 11/2016 | Olson |
| 2016/0357187 A1 | 12/2016 | Ansari |
| 2017/0004406 A1 | 1/2017 | Aghamohammadi |
| 2017/0028559 A1 | 2/2017 | Davidi et al. |
| 2017/0057087 A1 | 3/2017 | Lee |
| 2017/0120448 A1 | 5/2017 | Lee et al. |

(56) References Cited

U.S. PATENT DOCUMENTS

| | | |
|---|---|---|
| 2017/0123419 A1 | 5/2017 | Levinson et al. |
| 2017/0132334 A1 | 5/2017 | Levinson et al. |
| 2017/0146999 A1 | 5/2017 | Cherepinsky et al. |
| 2017/0157769 A1 | 6/2017 | Aghamohammadi et al. |
| 2017/0168485 A1 | 6/2017 | Berntorp et al. |
| 2017/0168488 A1 | 6/2017 | Wierzynski et al. |
| 2017/0193830 A1 | 7/2017 | Fragoso et al. |
| 2017/0210008 A1 | 7/2017 | Maeda |
| 2017/0219353 A1 | 8/2017 | Alesiani |
| 2017/0252922 A1 | 9/2017 | Levine et al. |
| 2017/0252924 A1 | 9/2017 | Vijayanarasimhan et al. |
| 2017/0305015 A1 | 10/2017 | Krasny et al. |
| 2017/0315530 A1 | 11/2017 | Godau et al. |
| 2018/0001472 A1 | 1/2018 | Konidaris et al. |
| 2018/0001476 A1 | 1/2018 | Tan et al. |
| 2018/0029231 A1 | 2/2018 | Davis |
| 2018/0029233 A1 | 2/2018 | Lager |
| 2018/0032039 A1 | 2/2018 | Huynh et al. |
| 2018/0074505 A1 | 3/2018 | Lv et al. |
| 2018/0113468 A1 | 4/2018 | Russell |
| 2018/0136662 A1 | 5/2018 | Kim |
| 2018/0150077 A1 | 5/2018 | Danielson et al. |
| 2018/0172450 A1 | 6/2018 | Lalonde et al. |
| 2018/0173242 A1 | 6/2018 | Lalonde et al. |
| 2018/0189683 A1 | 7/2018 | Newman |
| 2018/0222050 A1 | 8/2018 | Vu et al. |
| 2018/0222051 A1 | 8/2018 | Vu et al. |
| 2018/0229368 A1 | 8/2018 | Leitner et al. |
| 2018/0281786 A1 | 10/2018 | Oyaizu et al. |
| 2018/0326582 A1 | 11/2018 | Yokoyama et al. |
| 2018/0339456 A1 | 11/2018 | Czinger et al. |
| 2019/0015981 A1 | 1/2019 | Yabushita et al. |
| 2019/0039242 A1 | 2/2019 | Fujii et al. |
| 2019/0086925 A1 | 3/2019 | Fan et al. |
| 2019/0143518 A1 | 5/2019 | Maeda |
| 2019/0163191 A1 | 5/2019 | Sorin et al. |
| 2019/0164430 A1 | 5/2019 | Nix |
| 2019/0196480 A1 | 6/2019 | Taylor |
| 2019/0216555 A1 | 7/2019 | DiMaio et al. |
| 2019/0232496 A1 | 8/2019 | Graichen et al. |
| 2019/0234751 A1 | 8/2019 | Takhirov |
| 2019/0240835 A1 | 8/2019 | Sorin et al. |
| 2019/0262993 A1 | 8/2019 | Cole et al. |
| 2019/0293443 A1 | 9/2019 | Kelly et al. |
| 2019/0391597 A1 | 12/2019 | Dupuis |
| 2020/0069134 A1 | 3/2020 | Ebrahimi Afrouzi et al. |
| 2020/0097014 A1 | 3/2020 | Wang |
| 2020/0215686 A1 | 7/2020 | Vijayanarasimhan et al. |
| 2020/0331146 A1 | 10/2020 | Vu et al. |
| 2020/0338730 A1 | 10/2020 | Yamauchi et al. |
| 2020/0338733 A1 | 10/2020 | Dupuis et al. |
| 2020/0353917 A1 | 11/2020 | Leitermann et al. |
| 2020/0368910 A1 | 11/2020 | Chu et al. |
| 2021/0009351 A1 | 1/2021 | Beinhofer et al. |
| 2022/0339875 A1 | 10/2022 | Czinger et al. |
| 2023/0063205 A1 | 3/2023 | Nerkar et al. |

FOREIGN PATENT DOCUMENTS

| | | |
|---|---|---|
| CN | 102814813 A | 12/2012 |
| CN | 103722565 A | 4/2014 |
| CN | 104407616 A | 3/2015 |
| CN | 104858876 A | 8/2015 |
| CN | 106660208 A | 5/2017 |
| CN | 107073710 A | 8/2017 |
| CN | 107486858 A | 12/2017 |
| CN | 108297059 A | 7/2018 |
| CN | 108789416 A | 11/2018 |
| CN | 108858183 A | 11/2018 |
| CN | 108942920 A | 12/2018 |
| CN | 109521763 A | 3/2019 |
| CN | 109782763 A | 5/2019 |
| CN | 114073585 A | 2/2022 |
| CN | 108453702 B | 3/2022 |
| EP | 1901150 A1 | 3/2008 |
| EP | 2306153 A2 | 4/2011 |
| EP | 3250347 A1 | 12/2017 |
| EP | 3486612 A1 | 5/2019 |
| EP | 3725472 A1 | 10/2020 |
| JP | 11-249711 A | 9/1999 |
| JP | 11-296229 A | 10/1999 |
| JP | 2002-073130 A | 3/2002 |
| JP | 2003127077 A | 5/2003 |
| JP | 2005032196 A | 2/2005 |
| JP | 2006-224740 A | 8/2006 |
| JP | 2007257274 A | 10/2007 |
| JP | 2008502488 A | 1/2008 |
| JP | 2008-65755 A | 3/2008 |
| JP | 2008134165 A | 6/2008 |
| JP | 2009-116860 A | 5/2009 |
| JP | 2010-061293 A | 3/2010 |
| JP | 2010210592 A | 9/2010 |
| JP | 2011-75382 A | 4/2011 |
| JP | 2012056023 A | 3/2012 |
| JP | 2012-190405 A | 10/2012 |
| JP | 2012-243029 A | 12/2012 |
| JP | 2013193194 A | 9/2013 |
| JP | 2014-184498 A | 10/2014 |
| JP | 2015044274 A | 3/2015 |
| JP | 2015-517142 A | 6/2015 |
| JP | 2015208811 A | 11/2015 |
| JP | 2016099257 A | 5/2016 |
| JP | 2017136677 A | 8/2017 |
| JP | 2018-505788 A | 3/2018 |
| JP | 2018144158 A | 9/2018 |
| JP | 2018144166 A | 9/2018 |
| KR | 19980024584 A | 7/1998 |
| KR | 10-2011-0026776 A | 3/2011 |
| KR | 20130112507 A | 10/2013 |
| KR | 20150126482 A | 11/2015 |
| KR | 10-2017-0018564 A | 2/2017 |
| KR | 10-2017-0044987 A | 4/2017 |
| KR | 10-2017-0050166 A | 5/2017 |
| KR | 20180125646 A | 11/2018 |
| TW | 201318793 A | 5/2013 |
| WO | 99/24914 A1 | 5/1999 |
| WO | 2015113203 A1 | 8/2015 |
| WO | 2016/122840 A1 | 8/2016 |
| WO | 2017168187 A1 | 10/2017 |
| WO | 2017/214581 A1 | 12/2017 |
| WO | 2018043525 A1 | 3/2018 |
| WO | 2019/183141 A1 | 9/2019 |
| WO | 2020040979 A1 | 2/2020 |
| WO | 2020117958 A1 | 6/2020 |

OTHER PUBLICATIONS

International Search Report and Written Opinion issued in International Application No. PCT/US2021/061427, mailed Apr. 29, 2022, 14 pages.

International Search Report and Written Opinion issued in International Application No. PCT/US2021/013610, mailed Apr. 22, 2021, 9 pages.

Non-Final Office Action issued in U.S. Appl. No. 16/909,096, mailed May 6, 2022, 49 pages.

International Search Report and Written Opinion issued in International Application No. PCT/US2021/056317, mailed Feb. 11, 2022, 13 pages.

Office Action issued in Japanese Application No. 2021-171704, mailed Jan. 28, 2022, 3 pages.

Office Action issued in Japanese Application No. 2021-171726, mailed Jan. 26, 2022, 4 pages.

Notice of Allowance issued in U.S. Appl. No. 16/308,693, mailed Sep. 23, 2021, 23 pages.

Office Action Issued in Japanese Application No. 2018-564836, Mailed Date: May 19, 2020, 3 Pages.

International Search Report and Written Opinion issued in International Application No. PCT/US2020/034551, Mailed Date: Aug. 31, 2020, 16 pages.

International Search Report issued in PCT/US2019/064511, Mailed Date: Mar. 27, 2020, 12 pages.

(56) References Cited

OTHER PUBLICATIONS

International Search Report issued in International Application No. PCT/US2020/039193, Mailed Date: Sep. 29, 2020, 7 pages.
Non-Final Office Action Issued in U.S. Appl. No. 16/308,693, Mailed Date: Dec. 11, 2020, 23 Pages.
Non-Final Office Action Issued in U.S. Appl. No. 16/240,086, Mailed Date: Feb. 11, 2021, 57 Pages.
Non-Final Office Action Issued in U.S. Appl. No. 16/268,290, Mailed Date: Jan. 27, 2021, 54 Pages.
Non-Final Office Action Issued in U.S. Appl. No. 16/308,693, Mailed Date: May 14, 2021, 26 Pages.
Office Action Issued in Taiwanese Application No. 106119452, Mailed Date: Jun. 16, 2021, 19 Pages.
Non-Final Office Action Issued in U.S. Appl. No. 16/268,290, Mailed Date: Jun. 17, 2021, 35 Pages.
Non-Final Office Action Issued in U.S. Appl. No. 16/308,693, mailed Jun. 1, 2020, 16 pages.
Reconsideration Report by Examiner before Appeal issued in Japanese Application No. 2018-564836, mailed Jun. 2, 2021, 2 pages.
Final Office Action issued in U.S. Appl. No. 16/240,086, mailed Aug. 2, 2021, 88 pages.
Extended European Search Report issued in European Application No. 19851097.6, dated Jul. 23, 2021, 15 pages.
J. A. Corrales et al. "Safe human-robot interaction based on dynamic sphere-swept line bounding volumes" Robotic and Computer-Integrated Manufacturing 27, 2011, 9 pages.
Angel P. Del Pobil et al. "A New Representation for Collision Avoidance and Detection" Proceedings of the 1992 IEEE International Conference on Robotics and Automation, May 1992, 7 pages.
Yuichi Sato et al. "Efficient Collision Detection Using Fast Distance-Calculation Algorithms for Convex and Non-Convex Objects" Proceedings of the 1996 IEEE International Conference on Robotics and Automation, Apr. 1996, 8 pages.
Alexander Martín Turrillas, "Improvement of a Multi-Body Collision Computation Framework and its Application to Robot (Self-) Collision Avoidance" German Aerospace Center (DLR) Institute of Robotics and Mechatronics, Master's Thesis, Jun. 1, 2015, 34 pages.
Non-Final Office Action issued in U.S. Appl. No. 16/268,290, mailed Jun. 17, 2021, 35 pages.
International Search Report and Written Opinion issued in International Application No. PCT/US2020/047429, mailed Nov. 23, 2020, 9 pages.
Notice of Allowance issued in U.S. Appl. No. 16/268,290, mailed Sep. 24, 2021, 8 pages.
Extended European Search Report issued in European Application No. 20832308.9, mailed Jul. 18, 2022, 10 pages.
Extended European Search Report issued in European Application No. 20857383.2, mailed Jul. 25, 2022, 10 pages.
Second Office Action issued in U.S. Appl. No. 16/909,096, mailed Sep. 7, 2022, 54 pages.
First Office Action issued in U.S. Appl. No. 16/999,339, mailed Sep. 14, 2022, 18 pages.
First Office Action issued in U.S. Appl. No. 16/883,376, mailed Sep. 27, 2022, 26 pages.
Extended European Search Report issued in European Application No. 21744840.6, mailed Nov. 7, 2022, 14 pages.
Notice of Allowance issued in U.S. Appl. No. 17/153,662, mailed Dec. 6, 2022, 15 pages.
Search Report issued in Taiwanese Application No. 108104094, completed Feb. 4, 2023, 2 pages.
Office Action issued in Japanese Application No. 2021-571340, mailed Feb. 2, 2023, 10 pages.
Search Report issued in Chinese Application No. 201980024188.4, completed Feb. 17, 2023, 6 pages.
First Office Action issued in U.S. Appl. No. 16/981,467, mailed Mar. 16, 2023, 19 pages.
First Office Action issued in U.S. Appl. No. 17/506,364, mailed Apr. 28, 2023, 50 pages.
Extended European Search Report issued in European Patent Application No. 20818760.9, mailed May 10, 2023, 9 pages.
Search Report issued in Chinese Application No. 202080059714.3, mailed May 23, 2023, 3 pages.
Search Report issued in Chinese Application No. 202080040382.4, completed May 24, 2023, 6 pages.
Search Report issued in Chinese Application No. 202080055382.1, completed Jun. 26, 2023, 4 pages.
Search Report issued in Chinese Application No. 201980055188.0, completed Jun. 30, 2023, 2 pages.
International Search Report and Written Opinion issued in International Application No. PCT/US2023/064012, Mailed Jul. 10, 2023, 15 pages.
Office Action issued in Japanese Application No. 2021-571340, mailed Aug. 8, 2023, 8 pages.
First Office Action issued in U.S. Appl. No. 17/270,597, mailed Aug. 18, 2023, 25 pages.
Second Office Action issued in U.S. Appl. No. 17/506,364, mailed Aug. 25, 2023, 55 pages.
Extended European Search Report issued in European Application Case No. 21789270.2 mailed Sep. 1, 2023, 23 pages.
Search Report issued in Tawanese Application No. 108130161, completed Sep. 2, 2023, 3 pages.
Office Action issued in Japanese Application No. 2022-562247, mailed Sep. 25, 2023, 7 pages.
Office Action issued in Japanese Application No. 2022-556467, mailed Sep. 28, 2023, 10 pages.
MacFarlane, S. et al., "Jerk-bounded manipulator trajectory planning: design for real-time applications," IEEE Transactions on Robotics and Automation, Feb. 19, 2003, pp. 42-52, vol. 19, issue 1.
Dong, Jingyan et al., "Feed-rate optimization with jerk constraints for generating minimum-time trajectories," International Journal of Machine Tools and Manufacture, Oct. 2007, (Accessible: Mar. 24, 2007), pp. 1941-1955, vol. 47, issue 12-13.
Haschke, R. et al., "On-line planning of time-optimal, jerk-limited trajectories," 2008 IEEE/RSJ International Conference on Intelligent Robots and Systems, Sep. 2008, pp. 3248-3253, IEEE, Nice, France.
Bharathi, Akilan et al., "Feedrate optimization for smooth minimum-time trajectory generation with higher order constraints," The International Journal of Advanced Manufacturing Technology, Feb. 2016, (Accessible: Jun. 28, 2015), pp. 1029-1040, vol. 82, issue 5-8.
Lin, Jianjie et al., "An Efficient and Time-Optimal Trajectory Generation Approach for Waypoints Under Kinematic Constraints and Error Bounds," 2018 IEEE/RSJ International Conference on Intelligent Robots and Systems (IROS), Oct. 2018, pp. 5869-5876, IEEE, Madrid, Spain.
Perumaal, S. Saravana et al., "Automated Trajectory Planner of Industrial Robot for Pick-and-Place Task," International Journal of Advanced Robotic Systems, Feb. 2013, (Accessible: Jan. 1, 2013), p. 100, vol. 10, issue 2.
Gasparetto, A., and V. Zanotto, "A new method for smooth trajectory planning of robot manipulators," Mechanism and Machine Theory, Apr. 2007, (Accessible: Jun. 5, 2006), pp. 455-471, vol. 42, issue 4.
Gasparetto, A., A. Lanzutti, et al., "Experimental validation and comparative analysis of optimal time-jerk algorithms for trajectory planning," Robotics and Computer-Integrated Manufacturing, Apr. 2012, (Accessible: Sep. 29, 2011), pp. 164-181, vol. 28, issue 2.
Mattmüller, Jan et al., "Calculating a near time-optimal jerk-constrained trajectory along a specified smooth path," The International Journal of Advanced Manufacturing Technology, Dec. 2009, (Accessible: Apr. 19, 2009), pp. 1007-1016, vol. 45, issue 9-10.
Kavraki et al, "Probabilistic roadmaps for path planning in high-dimensional spaces", on Robotics and Automation, vol. 12, No. 4, pp. 566-580, Aug. 1996.
Schwesinger, Ulrich, "Motion Planning in Dynamic Environments with Application to Self-Driving Vehicles," (Doctoral dissertation), ETH, 2017, 65 pages, Zurich.
Li, Mingkang et al., "A Novel Cost Function for Decision-Making Strategies in Automotive Collision Avoidance Systems," 2018 IEEE International Conference on Vehicular Electronics and Safety (ICVES), Sep. 2018, pp. 1-8, IEEE, Madrid.

(56) References Cited

OTHER PUBLICATIONS

Potthast, Christian et al., "Seeing with your hands: A better way to obtain perception capabilities with a personal robot," Advanced Robotics and Its Social Impacts, Oct. 2011, pp. 50-53, IEEE, Menlo Park, CA, USA.
López-Damian, Efraín et al., "Probabilistic view planner for 3D modelling indoor environments," 2009 IEEE/RSJ International Conference on Intelligent Robots and Systems, Oct. 2009, pp. 4021-4026, IEEE, St. Louis, MO.
Kececi, F. et al., "Improving visually servoed disassembly operations by automatic camera placement," Proceedings of the 1998 IEEE International Conference on Robotics and Automation, May 1998, pp. 2947-2952, vol. 4, IEEE, Leuven, Belgium.
Pires, E. J. Solteiro et al., "Robot Trajectory Planning Using Multi-objective Genetic Algorithm Optimization," Genetic and Evolutionary Computation—GECCO 2004, Lecture Notes in Computer Science (LNCS), Jun. 2004, pp. 615-626, vol. 3102, Springer Berlin Heidelberg.
Pashkevich, A. P. et al., "Multiobjective optimisation of robot location in a workcell using genetic algorithms," UKACC International Conference on Control '98, Sep. 1998, pp. 757-762, vol. 1998, publication No. 455, IET, Swansea, UK.
Ratliff, Nathan et al., "CHOMP: Gradient optimization techniques for efficient motion planning," 2009 IEEE International Conference on Robotics and Automation, May 2009, pp. 489-494, IEEE, Kobe.
Lim, Zhen Yang et al., "Multi-objective hybrid algorithms for layout optimization in multi-robot cellular manufacturing systems," Knowledge-Based Systems, Mar. 2017, (Accessible: Jan. 3, 2017), pp. 87-98, vol. 120.
Barral, D. et al., "Simulated Annealing Combined with a Constructive Algorithm for Optimising Assembly Workcell Layout," The International Journal of Advanced Manufacturing Technology, Apr. 20, 2001, pp. 593-602, vol. 17, Issue 8.
Tao, Long et al., "Optimization on multi-robot workcell layout in vertical plane," 2011 IEEE International Conference on Information and Automation, Jun. 2011, pp. 744-749, IEEE, Shenzhen, China.
Klampfl, Erica et al., "Optimization of workcell layouts in a mixed-model assembly line environment," International Journal of Flexible Manufacturing Systems, Oct. 10, 2006, pp. 277-299, vol. 17, Springer.
Kalawoun, Rawan, "Motion planning of multi-robot system for airplane stripping," (Doctoral dissertation) Universite Clermont Auvergne [2017-2020], Sep. 11, 2019, 167 pages.
Kapanoglu, Muzaffer et al., "A pattern-based genetic algorithm for multi-robot coverage path planning minimizing completion time," Journal of Intelligent Manufacturing, Aug. 2012, (Accessible: May 13, 2010), pp. 1035-1045, vol. 23, issue 4.
Hassan, Mahdi, et al. "Modeling and stochastic optimization of complete coverage under uncertainties in multi-robot base placements," 2016 IEEE/RSJ International Conference on Intelligent Robots and Systems (IROS), Oct. 2016, pp. 2978-84, IEEE, Daejeon, South Korea.
Hassan, Mahdi et al. "An approach to base placement for effective collaboration of multiple autonomous industrial robots," 2015 IEEE International Conference on Robotics and Automation (ICRA), May 2015, pp. 3286-3291, IEEE, Seattle, WA, USA.
Hassan, Mahdi et al., "Task oriented area partitioning and allocation for optimal operation of multiple industrial robots in unstructured environments," 2014 13th International Conference on Control Automation Robotics & Vision (ICARCV), Dec. 2014, pp. 1184-1189, IEEE, Marina Bay Sands, Singapore.
Hassan, Mahdi et al. "Simultaneous area partitioning and allocation for complete coverage by multiple autonomous Industrial robots," Autonomous Robots, Dec. 2017, (Accessible: Apr. 13, 2017), pp. 1609-1628, vol. 41, issue 8.
Notice of Allowance issued in U.S. Appl. No. 16/240,086, mailed Dec. 24, 2021, 28 pages.
"Motion Planning" 2009, 37 pages.

Jia Pan et al. "Efficient Configuration Space Construction and Optimization for Motion Planning" Engineering, Mar. 2015, vol. 1, Issue 1, 12 pages.
Chao Chen "Motion Planning for Nonholonomic Vehicles with Space Exploration Guided Heuristic Search" 2016, 140 pages.
Second Office Action issued in Japanese Application No. 2022054900, mailed Jul. 18, 2023, 6 pages.
Office Action issued in Japanese Application No. 2022-054900, mailed Feb. 7, 2023, 7 pages.
Office Action issued in U.S. Appl. No. 17/682,732, mailed Nov. 2, 2022, 45 pages.
Kavraki et al, "Probabilistic roadmaps for path planning in high-dimensional configuration spaces", IEEE Transactions on Robotics and Automation, vol. 12, No. 4, pp. 566-580, Aug. 1996.
International Search Report and Written Opinion Issued in PCT Application No. PCT/US17/36880, Mailed Date: Oct. 10, 2017, 15 Pages.
Hauck, Scott et al. "Configuration Compression for the Xilinx XC6200 FPGA," IEEE Transactions on Computer-Aided Design of Integrated Circuits and Systems, vol. 18, No. 8, 1998, 9 Pages.
Atay et al., "A Motion Planning Processor on Reconfigurable Hardware," All Computer Science and Engineering Research, Sep. 23, 2005, 13 Pages, Report No. WUCSE-2005-46, Department of Computer Science & Engineering—Washington University in St. Louis, St. Louis, MO.
Rodriguez, Carlos et al. "Planning manipulation movements of a dual-arm System considering obstacle removing," Robotics and Autonomous Systems, Elsevier Science Publishers, Amsterdam, NL, vol. 62, No. 12, Aug. 1, 2014, 11 Pages.
International Search Report and Written Opinion Issued in PCT Application No. PCT/US2016/012204, Mailed Date: Mar. 21, 2016, 10 Pages.
First Office Action Issued in Japanese Patent Application No. 2017-557268, Mailed Date: Aug. 7, 2018, 15 Pages.
Extended European Search Report Issued in European Application No. 16743821.7, Mailed Date: Apr. 10, 2018, 9 Pages.
Second Office Action Issued in Japanese Patent Application No. 2017-557268, Mailed Date: Feb. 26, 2019, 5 Pages.
Invitation to Pay Additional Fees and, Where Applicable, Protest Fee Issued in PCT/US17/36880, Mailed Date: Aug. 14, 2017, 2 pages.
Extended European Search Report Issued in European Application No. 17811131.6, Mailed Date: Apr. 24, 2019, 16 Pages.
Sean Murray et al., "Robot Motion Planning on a Chip", Robotics: Science and Systems 2016, Jun. 22, 2016, 9 pages.
International Search Report and Written Opinion Issued in PCT/US2019/012209, Mailed Date: Apr. 25, 2019, 26 pages.
Sean Murray et al., "The microarchitecture of a real-time robot motion planning accelerator", 2016 49th Annual IEEE/ACM International Symposium on Microarchitecture (Micro), IEEE, Oct. 15, 2016, 12 pages.
Extended European Search Report Issued in European Application No. 18209405.2, Mailed Date: Aug. 2, 2019, 10 Pages.
International Search Report and Written Opinion Issued in International Application No. PCT/US2019/023031, Mailed Date: Aug. 14, 2019, 19 pages.
International Search Report and Written Opinion Issued in International Application No. PCT/US2019/016700, Mailed Date: May 20, 2019, 14 pages.
Merriam-Webster, "Definition of Or", Retrieved Sep. 9, 2019, 12 pages, https://www.merriam-webster.com/dictionary/or.
Non-Final Office Action Issued in U.S. Appl. No. 15/546,441, Mailed Date: Sep. 17, 2019, 52 pages.
Office Action Issued in Japanese Application No. 2018-564836, Mailed Date: Dec. 3, 2019, 3 Pages.
International Search Report and Written Opinion Issued in International Application No. PCT/US2019/045270, Mailed Date: Nov. 25, 2019, 13 pages.
Mike Stilman et al., "Manipulation Planning Among Movable Objects", Proceedings of the IEEE Int. Conf. on Robotics and Automation (ICRA '07), Apr. 2007, 6 pages.

(56) References Cited

OTHER PUBLICATIONS

David E. Johnson et al., "Bound Coherence for Minimum Distance Computations", Proceedings of the 1999 IEEE International Conference on Robotics & Automation, May 1999, 6 pages.

APPARATUS, METHOD AND ARTICLE TO FACILITATE MOTION PLANNING IN AN ENVIRONMENT HAVING DYNAMIC OBJECTS

CROSS-REFERENCE TO RELATED APPLICATIONS

This application is the U.S. National Stage Application of International Application No. PCT/US2019/064511, filed Dec. 4, 2019, which claims the benefit of U.S. Provisional Patent Application Ser. No. 62/775,257, filed Dec. 4, 2018, which are hereby incorporated by reference in their entirety.

STATEMENT REGARDING FEDERALLY SPONSORED RESEARCH

This invention was made with Government support under Federal Grant No. 1819302 awarded by the National Science Foundation. The Federal Government has certain rights to this invention.

BACKGROUND

Technical Field

The present disclosure generally relates to motion planning, and in particular to systems and methods that facilitate motion planning for agents, for example autonomous vehicles or other robotic agents in environments having dynamic objects.

Description of the Related Art

Motion planning is a fundamental problem in robotics. Motion planning may be employed to controlling motion of autonomous vehicles or control the motion of other types of robots or portions (e.g., appendages) of robots. For example, a motion plan specifies a path an autonomous vehicle or robot or portion thereof can follow from a first configuration state (e.g., starting pose) to a goal state (e.g., ending pose), typically without colliding with any obstacles in an operational environment or with a reduced possibility of colliding with any objects in the operational environment. However, in some instances, interaction with objects in the operational environment may be desired, such as to inspect an object, collect information from an object, exchange information with an object, or even collide with an object, for instance as in a game. There are typically four main components involved in creating a motion plan: perception, roadmap (also referred to herein as a motion planning graph) construction, collision detection and path search, Each provides challenges to overcome within an environment surrounding the autonomous vehicle or robot that includes static objects, and in particular, dynamic objects moving within the environment. It also may be possible that the future movements of the dynamic obstacles are unknown or uncertain. Such dynamic objects may be moving contrary to the goals of autonomous vehicle or other type of robot. Thus, it is advantageous for the autonomous vehicle or other type of robot to perform motion planning to keep up with those changes in real time to avoid collision or intercept such objects to achieve the goal state.

BRIEF SUMMARY

A motion planner system may receive perception information that represents the environment in which a primary agent (e.g., autonomous vehicle, other type of robot) operates. The motion planner system performs a collision assessment on a planning graph for the primary agent prior to execution of a motion plan, taking into account actions by other agents in the environment, including how those other agents may react to actions taken by the primary agent as well as each other.

Each edge of the planning graph represents a transition of the primary agent from one state to another state in a configuration space of the primary agent, and has an inherent or operational cost associated with it. Inherent or operational costs may reflect various operational parameters of the primary agent, such as, for example, fuel and/or energy use and/or time. Each edge may have an initial weight corresponding to a respective inherent or operational cost.

For edges on the planning graph, which represent transitions in states of the primary agent, the system determines a probability of collision with a dynamic object in the environment based at least in part on the collision assessment and then modifies or adjusts the initial weights of the edges based on the probability of collision with the dynamic object. For example, the system may apply a cost function to each edge to perform a mathematical operation based on the initial weight for that edge (i.e., the weight that corresponds to the inherent cost) to obtain a modified weight. This may be done by adding an additional weight to the initial assigned weight based on the probability of collision, by multiplying the initial assigned weight by a probability of collision factor, or by applying some other function or formula involving the probability of collision and the initial weight that corresponds to the inherent cost. As described herein, the collision assessment advantageously accounts for the reactions of the other agents in the environment to the actions of the primary agent, as well as the reactions to one another. In addition to probability of collision, the system may assign object-specific costs which are independent of probability of collision, such as a cost reflective of the relative importance of the object. For example, the cost of a collision with a human may be assigned to be significantly higher than the cost of a collision with a tree.

For example, in instances where the goal of the primary agent is to avoid colliding with dynamic objects in its environment, the system may assign a weight with a relatively large positive value to edges of the planning graph if the respective edge has a relatively high respective probability of a collision with one or more dynamic objects. The system may assign a weight with a relatively small positive value to edges of the planning graph if the respective edge has a relatively low respective probability of a collision with one or more dynamic objects in the environment. The system then performs an optimization to identify a path in the resulting planning graph with a relatively low potential of a collision with one or more dynamic objects in the environment in which the primary agent operates. The system then optionally causes the actuator system of the primary agent to implement a motion plan with the relatively low potential of a collision with such dynamic objects based at least n part on the optimization.

Also for example, in instances where the goal of the primary agent is to collide with dynamic objects in its environment, the system may assign a weight with a relatively low positive value to edges of the planning graph if the respective edge has a relatively high respective probability of a collision with one or more dynamic objects, while assigning a weight with a relatively high positive value to edges of the planning graph if the respective edge has a relatively low respective probability of a collision with one or more dynamic objects in the environment. The system then performs an optimization to identify a path in the resulting planning graph with a relatively high potential of a collision with one or more dynamic objects in the environment in which the primary agent operates. The system then optionally causes the actuator system of the primary agent to implement a motion plan with the relatively high potential of a collision with such dynamic objects based at least in part on the optimization.

In disclosed implementations, there is a computational strategy in which each edge in a lattice is initialized to "no collision." The intentions of other agents, e.g., dynamic objects, are sampled. For example, a behavioral model of each agent may be developed which treats agent intentions as modeling latent policies or goals, rather than simple trajectories. The latent policies or goals may be in a form which can be sampled to determine how the agent would react to other agent trajectories. Each agent's intention provides a trajectory t, resulting in a set S of trajectories. For each sample future trajectory t in S: the edges in the lattice that collide with t are determined (this may be done in parallel); and the edges' costs are incremented to reflect the collision probabilities (e.g., if 10% of trajectories collide with edge E, then E's collision probability is 10%). A least-cost path search is run (after application of one or more cost functions which include cost terms for probabilistic collisions) to find a plan. The cost of an edge does not have to be a linear function of the edge's collision probability.

In instances where the goal of the primary agent is to avoid collision with particular dynamic objects, the motion planner performs an optimization to identify a path in the resulting planning graph that provides a motion plan (e.g., route of travel) of the primary agent with a relatively low potential of a collision with such dynamic objects in the environment in which the primary agent operates. The system then causes the actuator system of the primary agent (e.g., autonomous vehicle) to implement a motion plan with the relatively low potential of a collision with one or more objects based at least in part on the optimization.

In instances where the goal of the primary agent is to collide with dynamic objects, the motion planner performs an optimization to identify a path in the resulting planning graph that provides a motion plan (e.g., route of travel) of the primary agent with a relatively high potential of a collision with such dynamic objects in the environment in which the primary agent operates. The system then causes the actuator system of the primary agent (e.g., autonomous vehicle) to implement a motion plan with the relatively high potential of a collision with one or more objects based at least in part on the optimization.

A motion planning method of operation in a processor-based system to perform motion planning via planning graphs is described, where each planning graph respectively comprises a plurality of nodes and edges, each node which represents, implicitly or explicitly, time and variables that characterize a state of a primary agent, which operates in an environment that includes one or more other agents, and each edge represents a transition between a respective pair of the nodes. The method may be summarized as including: for a current node in a first planning graph, for each trajectory in a set of trajectories that respectively represent actual or prospective trajectories of at least one of the one or more other agents, determining which edges of the first planning graph collide with the respective trajectory, if any of the edges collide with the respective trajectory; applying a cost function to one or more of the respective edges to reflect at least one of the determined collision or absence thereof; for each of a number of candidate nodes in the first planning graph, the candidate nodes being any node in the first planning graph that is directly coupled to the current node in the first planning graph by a respective single edge of the first planning graph, finding a least cost path from the current node to a goal node in the first planning graph that passes from the current node directly to the respective candidate node and then to the goal node, with or without a number of intervening nodes successively between the respective candidate node and the goal node along a corresponding path; after finding the least cost path for each of the candidate nodes with respect to the trajectories of the set of trajectories, for each of the candidate nodes, computing a respective value based at least in part on a respective cost associated with each least cost path for the respective candidate node across all of the trajectories; and selecting one of the candidate nodes based at least in part on the computed respective values.

Applying a cost function to one or more of the respective edges to reflect at least one of the determined collision or absence thereof may include: for any of the edges that are determined to collide with at least one trajectory, increasing a cost of the respective edge to a relatively high magnitude to reflect the determined collision, wherein the relatively high magnitude is relatively higher than a relatively low magnitude that reflects an absence of collision for at least one other edge.

Applying a cost function to one or more of the respective edges to reflect at least one of the determined collision or absence thereof may include: for any of the edges that are determined not to collide with at least one trajectory, increasing a cost of the respective edge to a relatively high magnitude to reflect the determined absence of collision, wherein the relatively high magnitude is relatively higher than a relatively low magnitude that reflects a collision for at least one other edge.

The method may further include for each of at least one of the other agents in the environment, sampling to determine the respective prospective trajectory of the other agent; and forming the set of trajectories from the determined respective actual or prospective trajectory of each of the other agents.

The method may further include selecting the candidate nodes in the first planning graph from the other nodes of the first planning graph based on the candidate nodes being any node in the first planning graph that is directly coupled to the current node in the first planning graph by a respective single edge of the first planning graph.

Computing a respective value based at least in part on a respective cost associated with each least cost path for the respective candidate node across all of the trajectories, may include computing the average value of the respective cost associated with each least cost path that extends from the current node to the goal node via the respective candidate node and via all of the intervening nodes, if any.

Selecting one of the candidate nodes based at least in part on the computed respective values may include selecting the one of the candidate nodes which has the respective computed value that is the smallest of all of the computed values.

The method may further include updating a trajectory of the primary agent based on the selected one of the candidate nodes.

The method may further include initializing the first planning graph before applying the cost function to the respective edges to reflect the determined collisions. Initializing the first planning graph may include: for each edge in the first planning graph performing a collision assessment for the edge relative to each of a number of static objects in the environment to identify collisions, if any, between the respective edge and the static objects. Initializing the first planning graph may include: for each edge that is assessed as colliding with at least one of the static objects, applying a cost function to the respective edge to reflect the assessed collision or removing the edge from the first planning graph. Initializing the first planning graph may include: for each node in the first planning graph, computing a cost to the goal node from the node; and logically associating the computed cost with the respective node.

The method may further include: assigning the selected one of the candidate nodes to be a new current node in the first planning graph: for the new current node in a first planning graph, for each trajectory in a set of trajectories that respectively represent actual or prospective trajectories of at least one of the one or more other agents, determining which edges of the first planning graph collide with the respective trajectory, if any of the edges collide with the respective trajectory; applying a cost function to one or more of the respective edges to reflect at least one of the determined collision or absence thereof; and for each of a number of new candidate nodes in the first planning graph, the new candidate nodes being any node in the first planning graph that is directly coupled to the new current node in the first planning graph by a respective single edge of the first planning graph, finding a least cost path from the new current node to a goal node in the first planning graph that passes from the new current node directly to the respective new candidate node and then to the goal node, with or without a number of intervening nodes successively between the respective new candidate node and the goal node along a corresponding path; after finding the least cost path for each of the new candidate nodes with respect to the trajectories of the set of trajectories, for each of the new candidate nodes, computing a respective value based at least in part on a respective cost associated with each least cost path for the respective new candidate node across all of the trajectories; and selecting one of the new candidate nodes based at least in part on the computed respective values.

A processor-based system to perform motion planning via planning graphs is described, where each planning graph respectively comprises a plurality of nodes and edges, each node which represents, implicitly or explicitly, time and variables that characterize a state of a primary agent, which operates in an environment that includes one or more other agents, and each edge represents a transition between a respective pair of the nodes. The system may be summarized as including: at least one processor; and at least one non-transitory processor-readable medium that stores at least one of processor-executable instructions or data which, when executed by the at least one processor, causes the at least one processor to execute any of the methods summarized above.

A method of operation in a motion planning system is described, that employs graphs with nodes that represent states and edges that represent transitions between states. The method can be summarized as including: for each available next node with respect to a current node in a first graph, calculating, via at least one processor, a respective associated representative cost to reach a goal node from the current node via the respective next node, the respective associated representative cost which reflects a respective representative cost associated with each available path from the current node to the goal node via the respective next node in light of an assessment of a probability of collision with one or more agents in an environment based on a nondeterministic behavior of each of the one or more agents in the environment; the agents which can vary any one or more of a position, a velocity; a trajectory, a path of travel, or a shape over time; selecting, via at least one processor, a next node based on the calculated respective associated representative costs for each available next node; and commanding, via at least one processor, a movement based at least in part on the selected next node.

Calculating a respective associated representative cost to reach a goal node from the current node via the respective next node, may include: for each prospective path between the current node and the goal node via the respective next node, for each edge between the current node and the goal node along the respective prospective path; determining a respective associated representative cost; assigning the determined respective associated representative cost for each edge to the respective edge for each edge between the current node and the goal node along the respective prospective path; determining a least cost path for the respective next node from the respective prospective paths between the current node and the goal node via the respective next node based at least on part on the assigned determined respective associated representative costs; and assigning a value representative of the determined least cost path to the respective next node.

Determining a least cost path for the respective next node from the respective prospective paths between the current node and the goal node via the respective next node based at least on part on the assigned determined respective associated representative costs may include determining a least cost path that includes a cost of traversing from the current node to the respective next node.

Determining a respective associated representative cost for each edge between the current node and the goal node along the respective prospective path; may include: for each edge between the current goal and the goal node along the respective prospective path, and assessing a risk of a collision with one or more agents in the environment based on one or more probabilistic functions that respectively represent the nondeterministic behavior of each of the one or more agents in the environment.

Assessing a risk of a collision with one or more agents in the environment based on one or more probabilistic functions that respectively represent the nondeterministic behavior of each of the one or more agents in the environment may include: sampling the probabilistic functions that respectively represent the nondeterministic behavior of each of the one or more agents in the environment in light of a series of actions represented by respective ones of each edge between the respective next node and each successive node along the respective prospective path.

Assessing a risk of a collision with one or more agents in the environment based on one or more probabilistic functions that respectively represent the nondeterministic behavior of each of the one or more agents in the environment may include: sampling the probabilistic functions that respectively represent the nondeterministic behavior of each of the one or more agents in the environment in light of a series of actions represented by respective ones of each edge between the respective next node and each successive node along the respective prospective path to a present node, the present node being a further node along the respective prospective path reached during the assessing of the risk of collision.

Assessing a risk of a collision with one or more agents in the environment based on one or more probabilistic functions that respectively represent the nondeterministic behavior of each of the one or more agents in the environment may include: for each of the agents, repeatedly sampling the respective probabilistic function that respectively represents the nondeterministic behavior of the respective agent. Repeatedly sampling the respective probabilistic function that respectively represents the nondeterministic behavior of the respective agent may include repeatedly sampling the respective probabilistic function for a plurality of iterations, a total number of the iterations based at least in part on an available amount of time before the commanding must occur.

Assessing a risk of a collision with one or more agents in the environment based on one or more probabilistic functions that respectively represent the nondeterministic behavior of each of the one or more agents in the environment may include: for each of the agents, repeatedly sampling the probabilistic functions that respectively represent the nondeterministic behavior of each of the one or more agents in the environment in light of a series of actions represented by respective ones of each edge between the respective next node and each successive node along the respective prospective path.

Assessing a risk of a collision with one or more agents in the environment based on one or more probabilistic functions that respectively represent the nondeterministic behavior of each of the one or more agents in the environment may include: for each of the agents, repeatedly sampling the probabilistic functions that respectively represent the nondeterministic behavior of each of the one or more agents in the environment in light of a series of actions represented by respective ones of each edge between the respective next node and each successive node along the respective prospective path to a present node, the present node being a further node along the respective prospective path reached during the assessing of the risk of collision. Assessing of the risk of collision involves simulation of traversal of the respective prospective paths.

Assessing a risk of a collision with one or more agents in the environment based on one or more probabilistic functions that respectively represent the nondeterministic behavior of each of the one or more agents in the environment may include: assessing a risk of collision via dedicated risk assessment hardware based at least on a probabilistically determined respective trajectory of each of the one or more agents in the environment, where the respective associated representative costs are based at least in part on the assessed risk of collision.

Assessing a risk of a collision with one or more agents in the environment based on one or more probabilistic functions that respectively represent the nondeterministic behavior of each of the one or more agents in the environment may include: assessing a risk of a collision with one or more agents in the environment based on one or more probabilistic functions that respectively represent the nondeterministic behavior of at least a secondary one of the agents in the environment, the primary one of the agents being an agent for which the motion planning is being performed.

The method may further include: initializing the first graph before calculating a respective associated representative cost to reach a goal node from the current node via the respective next node. Initializing the first graph, may include: performing a static collision assessment to identify any collisions with one or more static objects in the environment; for each node in the first graph, computing a respective cost to reach a goal node from the respective node; and for each node in the first graph, logically associating the respective computed cost to reach a goal node with the respective node.

A processor-based system to perform motion planning is described, that employs graphs with nodes that represent states and edges that represent transitions between states. The system may be summarized as including: at least one processor; and at least one nontransitory processor-readable medium that stores at least one of processor-executable instructions or data which, when executed by the at least one processor, causes the at least one processor to execute any of the above described methods.

A method of operation in a motion planning system is described, that employs graphs with nodes that represent states and edges that represent transitions between states to generate a motion plan for a primary agent. The method may be summarized as including: initializing a step counter T to a starting value (T=0); initializing a first graph; running a simulation, the simulation comprising: starting at a current node N in the first graph and while not a goal node G in the first graph: for one or more sampling iterations, for each secondary agent of one or more secondary agents in an environment, sampling an action that the respective secondary agent will take when the step counter is incremented (T+1, i.e., next step) from a probabilistic function that represents actions taken by the primary agent and taken by the one or more secondary agents from the starting value to a current value of the step counter; determining any edges of the first graph that are in collision with the next action; for any edges in collision with the next action, applying a respective cost function to the edge to reflect an existence of a collision condition; for each node in the first graph of a set of nodes that are directly connected to the current node, computing a value that is representative of a least cost path to traverse one or more paths from the current node to the goal node via one or more prospective paths via the respective node that is directly connected to the current node; determining whether to perform another sampling iteration; in response to determining not to perform another sampling iteration, selecting from the set of nodes that are directly connected to the current node; the one of the nodes of the set of nodes that has a least cost; incrementing the step counter (T=T+1); determining whether simulation is at the goal node, in response to a determination that the simulation is not at the goal node, setting the selected node to be a new current node; without commanding the primary agent, and continue simulating; in response to a determination that the simulation is at the goal node, selecting a node having a least cost from the set of nodes that are directly connected to the current node; and providing an identification of the selected node having the least cost to command movement of the primary agent.

Sampling an action that the respective secondary agent will take when the step counter is incremented from a probabilistic function that represents actions taken by the one or more secondary agents and by the primary agent from the starting value to a current value of the step counter may include sampling the probabilistic function that represents a nondeterministic behavior of each of the one or more secondary agents in the environment in light of a series of the actions taken by the primary agent represented by respective ones of each edge between the respective node directly connected to the current node and each successive node along a route to the goal node.

Sampling the probabilistic functions that respectively represent the nondeterministic behavior of each of the one or more agents in the environment in light of a series of actions represented by respective ones of each edge may include: for each of the agents, repeatedly sampling the respective probabilistic function that respectively represent the nondeterministic behavior of the respective agent.

The primary agent may be a primary autonomous vehicle. The method may further include receiving perception information that represents the environment in which the primary autonomous vehicle operates; and implementing a resulting motion plan by the primary autonomous vehicle. Receiving perception information may include receiving perception information that represents a position and a trajectory of at least one dynamic object in the environment. Receiving perception information may include receiving perception information at a motion planner, the perception information collected via one or more sensors that are carried by the primary autonomous vehicle and which represents a position or a trajectory of at least one other vehicle in the environment.

The method may further include identifying, by an object detector, at least a first dynamic object in the environment from the perception information collected via the one or more sensors.

A motion planning system is described, that employs graphs with nodes that represent states and edges that represent transitions between states to generate a motion plan for a primary agent. The motion planning system may be summarized as including: at least one processor; at least one nontransitory processor-readable medium that stores processor executable instructions which, when executed by the at least one processor, cause the at least one processor to execute any of the above described methods.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
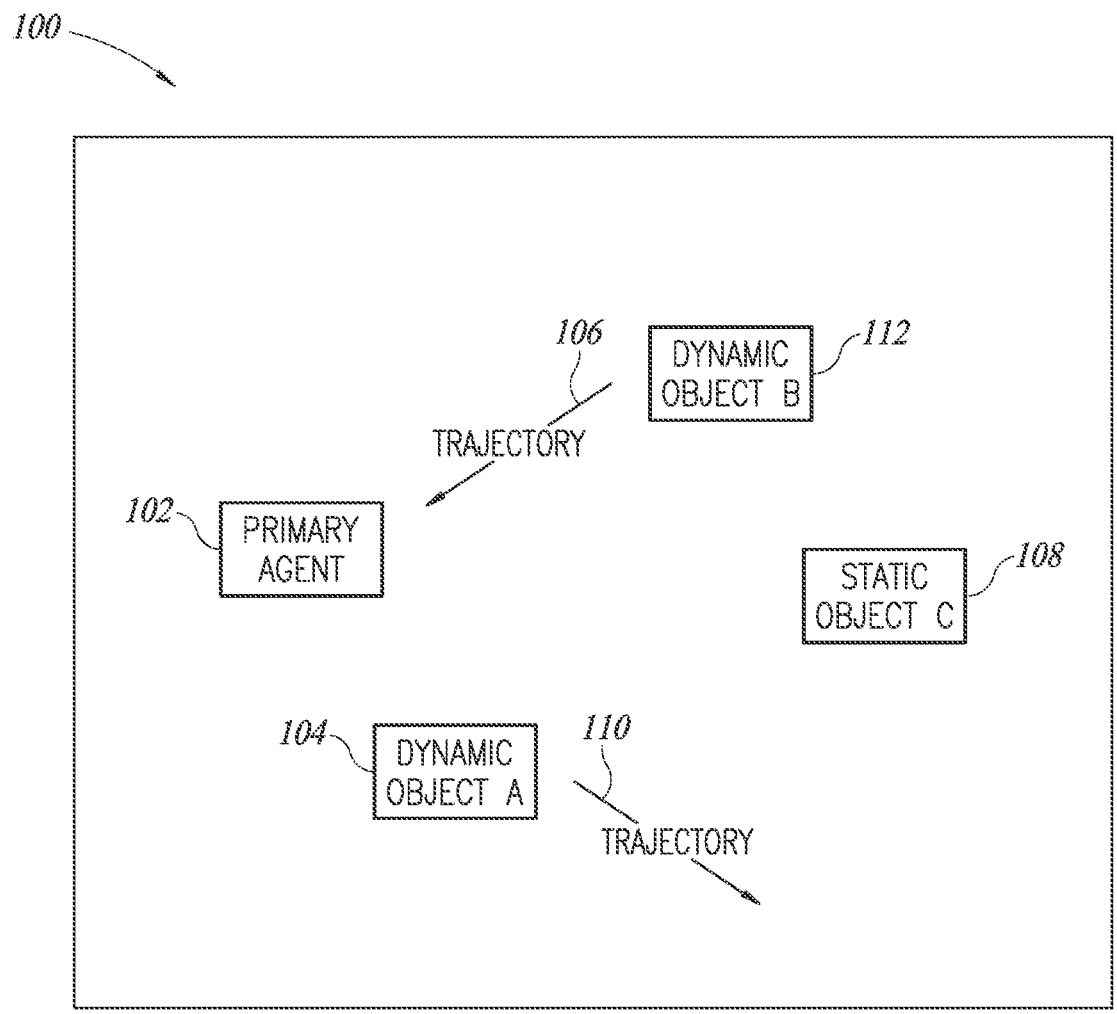
FIG. 1 is a schematic view of an environment in which a primary agent (e.g., autonomous vehicle, robot with or without appendage(s), etc.) may operate, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and construction of an occupancy grid and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structure or characteristic described in connection with the embodiment is included in at least one implementation or at least one embodiment. Thus, the appearances of the phrases "one implementation" or "an implementation" or "in one embodiment" or "in an embodiment" in various places throughout this specification are not necessarily all referring to the same implementation or the same embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference throughout this specification to "primary agent" or "a primary agent" means an agent (e.g., semi- or full-autonomous vehicle, robot with or without moveable appendages) for which a respective motion plan is being formulated or generated. Reference throughout this specification to "other agent" or "another agent" or "secondary agent" or "a secondary agent" means an agent (e.g., semi- or full-autonomous vehicle, robot with or without moveable appendages) other than the primary agent for which the respective motion plan is being formulated or generated. In some instances, other instances of motion planning may be occurring for these other or secondary agents, but those motion plans are not for the primary agent.

The headings and Abstract of the Disclosure provided herein are for convenience only and do not interpret the scope or meaning of the embodiments.

FIG. 1 shows a dynamic operational environment 100 in which primary agent (e.g., an autonomous vehicle, robot with or without moveable appendage(s)) 102 may operate, according to one illustrated embodiment. For the sake of brevity, the dynamic operational environment 100 is referred to herein as the environment. While generally described in terms of an autonomous vehicle, the various implementations described herein are applicable to robots or portions thereof, for example robots that are operable to navigate an environment and/or robots with one or more moveable appendages.

The environment represents a two-dimensional or three-dimensional space in which the primary agent (e.g., autonomous vehicle) 102 may operate and move. The primary agent 102 may be an automobile, airplane, ship, drone, or any other vehicle, or may be another type of robot, that can operate autonomously or semi-autonomously (i.e., at least partially autonomously) and move along routes or paths in the space represented by the environment 100. The environment 100 is the two- or three-dimensional space in which the vehicle operates and is different than the vehicle's "configuration space" (often called "C-space") referenced below with respect to the motion planning graphs of FIGS. 4A through 5B and as explained in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," which is hereby incorporated by reference in its entirety and in International Patent Application Publication No. \NO 2016/122840, filed Jan. 5, 2016, entitled "SPECIALIZED ROBOT MOTION PLANNING HARDWARE AND METHODS OF MAKING AND USING SAME," which is also hereby incorporated by reference in its entirety. The configuration space is typically many dimensional (i.e., greater than 3 dimensions). Referring to FIG. 1, the environment 100 can include obstacle collision regions. These obstacle collision regions may be due to static objects (e.g., buildings, trees, rocks, etc.) or dynamic objects (e.g., other aerial or ground-based vehicles, people, animals, rolling rocks, birds, etc.), which may be collectively referred to as "agents" or "other agents," in the environment 100. For example, static object C 108 represents an object that does not move in the environment 100 and creates a collision region in the environment 100 such that it is possible for vehicle 102 to collide with static object C 108 if they attempt to occupy the same space within the environment 100 at the same time. In various embodiments, there may be fewer or additional static objects than shown in FIG. 1.

In addition to the static objects, dynamic objects may also be present, including those representing objects that move in known/certain trajectories (e.g., a falling brick, a rolling can), those that are controlled by a conscious being (e.g., a bicyclist, pedestrian, a driver, a pilot, a bird, etc.) and those that are controlled by other autonomous systems, such as in the case of other autonomous vehicles or robots. Challenges to motion planning due to these dynamic objects involve the ability to perform motion planning at very fast speeds and the ability to analyze the uncertainty of how dynamic objects may move. The environment 100 surrounding the vehicle 102 can change rapidly, and it is advantageous for the vehicle 102 to perform motion planning to keep up with those changes. For example, as shown in FIG. 1, an agent, e.g., dynamic object A 104, is currently moving along a trajectory 110 away from the vehicle 102, However, there may be instances where it is desirable for vehicle 102 to follow or intercept dynamic object A 104, such as to inspect dynamic object A 104, collect information from dynamic object A 104, exchange information with dynamic object A 104, or even collide with dynamic object A 104 in a game.

Conversely, as shown in FIG. 1, dynamic object B 112 is currently moving along a trajectory 106 toward vehicle 102. There may be instances where it is desirable for vehicle 102 to avoid collision with or avoid getting near dynamic object B 112, such as to arrive at a goal destination without collision, avoid damage by such a collision, or to evade contact with dynamic object B 112, for instance in a game. In one embodiment, the goal of vehicle 102 is to maximize the time without a collision with dynamic object B 112 such that, for example, dynamic object B 112 runs out of fuel before colliding with the vehicle 102. The goal of vehicle 102 in one example embodiment is to minimize the probability of collision with dynamic object B 112 between the current time and time of arrival of the vehicle 102 at a desired destination or achieving a particular goal, or between the current time and when dynamic object B 112 runs out of fuel. There may be fewer or additional dynamic objects in the environment 100 than that shown in FIG. 1. Also, the environment may in some instances have a boundary corresponding to the range of vehicle 102, which may depend at least in part on the current fuel or energy available to vehicle 102.

While FIG. 1 illustrates a representative environment 100, typical environments may include many additional agents, including objects that correspond to other manned and autonomous vehicles and various other natural or artificial static and dynamic objects and obstacles. The concepts taught herein may be employed in a similar fashion with more populated environment than that illustrated.

Figure 2:
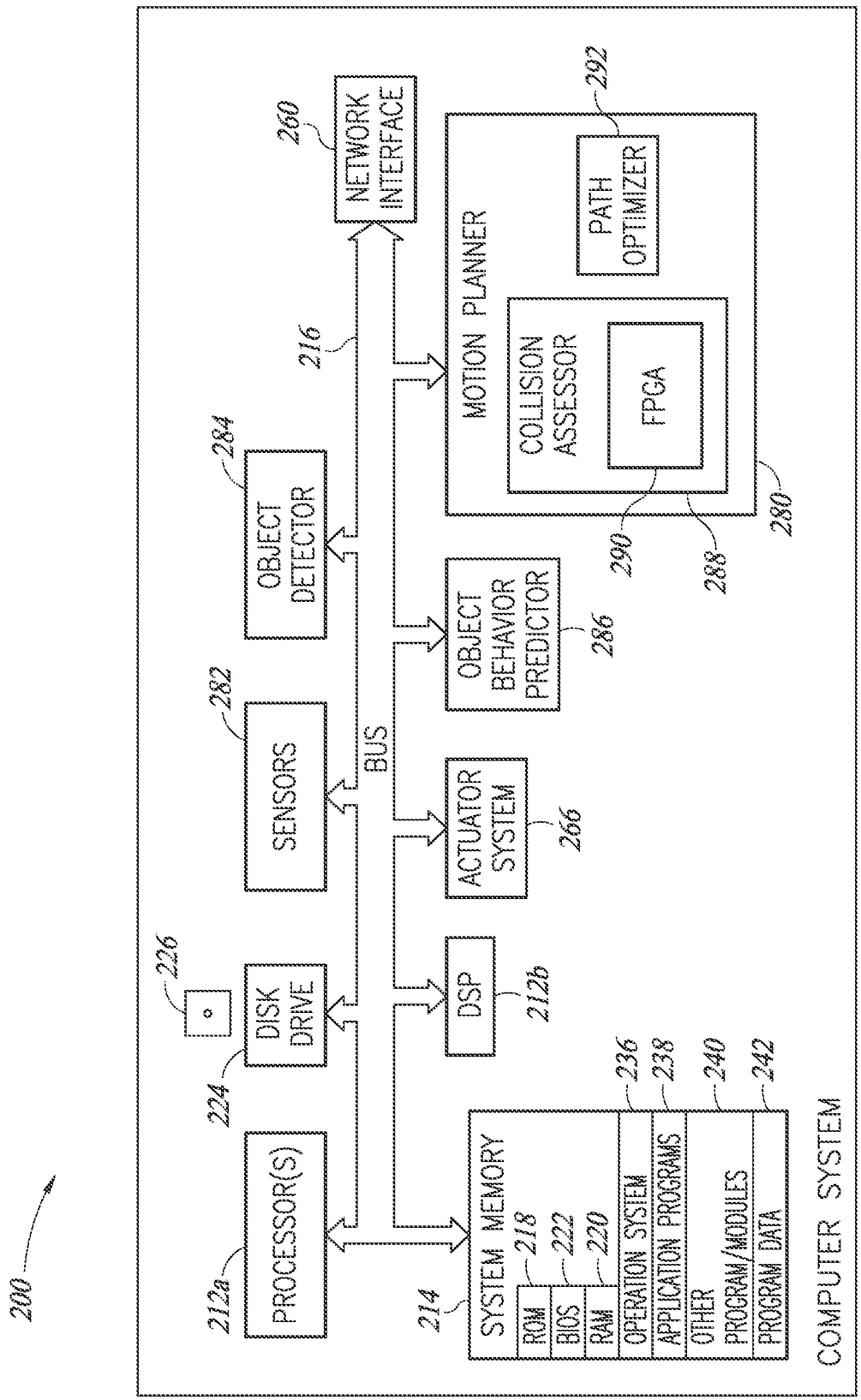
FIG. 2 is a functional block diagram of a computer system associated with a primary agent (e.g., autonomous vehicle, robot with or without moveable appendage(s), etc.) that may operate in the environment of FIG. 1, according to one illustrated embodiment.

FIG. 2 and the following discussion provide a brief, general description of a suitable controller in the form of a computer system 200 in which the various illustrated motion planning systems and methods might be implemented.

Although not required, many of the embodiments will be described in the general context of computer-executable instructions, such as program application modules, objects, or macros stored on computer- or processor-readable media and executed by a computer or processor and specialized vehicle motion planning hardware that can perform collision assessments and motion planning operations. Such motion planning operations may include performing a collision assessment on edges of a planning graph, determining and setting a probability of collision, performing an optimization to identify a path in the planning graph to either avoid collision or cause collision with an object in the environment by finding a least cost path within the planning graph and implementing such a motion plan.

Motion planning via a motion planner typically includes collision detection and finding a least cost path. The collision detection, the least cost path finding or both could, for example, be implemented on one or more field programmable gate arrays (FPGAs), advantageously allowing for easy reconfigurability. The collision detection, the least cost path finding or both could, for example, be implemented on one or more application specific integrated circuits (ASICs), advantageously allow fast processing while still allowing some reconfigurability.

When representing an agent, either a vehicle (e.g., an autonomous vehicle or robot) or an object in the environment (e.g., a static or dynamic obstacle), one may represent their surfaces as either voxels (3D pixels) or meshes of polygons (often triangles). Each discretized region of space is termed a "voxel," equivalent to a 3D (volumetric) pixel. In some cases, it is advantageous to represent the objects instead as boxes (rectangular prisms). Due to the fact that objects are not randomly shaped, there may be a significant amount of structure in how the voxels are organized; many voxels in an object are right next to each other in 3D space. Thus, representing objects as boxes may require far fewer bits (i.e., may require just the x, y, z coordinates for two opposite corners of the box). Also, doing intersection tests for boxes is comparable in complexity to doing so for voxels. Various other data structures may be used to represent 3D surfaces of objects, such as, for example, Euclidian distance field, binary space partition trees, etc.

In one embodiment, the collision assessment is performed by first streaming in all of the dynamic object voxels (or boxes) onto a processor (e.g., FPGA, ASIC). Then the edge information for each edge of the roadmap for the vehicle 102 is streamed in from memory devoted to the roadmap. Each edge has some number of voxels (or boxes) corresponding to the volume in 3D space swept by the vehicle 102 when making the transition in the roadmap from one state to another state represented by that edge. Those voxels or boxes swept by the vehicle 102 when making the transition in the roadmap from one state to another state represented by that edge are stored in memory for each edge of the roadmap. For each edge voxel (or box), when it is streamed in from the swept volume of an edge, if it collides with any of the obstacle voxels (or boxes), the system 200 determines a collision with that edge in the roadmap. For example, when an edge voxel is streamed in from the swept volume of edge x of the roadmap, if it collides with any of the obstacle voxels (or boxes), the system notes a collision with edge x. This implementation improves on the technology of collision assessment because it enables much larger roadmaps to be used in the collision assessment as compared to other designs in which the collision assessment is performed in parallel on all the edges of the planning graph. In particular, this helps overcome the disadvantage of other designs with respect to a limited amount of roadmap information that could be stored on chip circuitry. However, using the collision assessment method described herein, on-chip storage is often more than sufficient for storing all the obstacle boxes (although may be less so with using voxels). This provides the ability to store large roadmaps and/or multiple roadmaps in less expensive, off-chip storage, e.g., dynamic random access memory (DRAM).

In various implementations, such operations may be performed entirely in hardware circuitry or as software stored in a memory storage, such as system memory 214, and executed by one or more hardware processors 212a, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage. For example, performing the optimization to identify a path in the planning graph to either avoid collision or cause collision with an object in the environment by finding a least cost path within the planning graph may be performed by optimizer 292. In one example embodiment, when the path optimizer 292 is implemented with hardware, the topology of the planning graph may also be mapped onto a reconfigurable fabric of hardware units to enable rapid determination of the least cost path. This mapping involves programming each physical node with the addresses and edge weights of its logical neighbors. This allows the architecture to be reconfigurable to different planning graph topologies. Other implementations may use a mini-processor implemented on an FPGA.

In an alternative embodiment, the collision assessment may be performed in parallel on each of the edges of a resulting planning graph for the vehicle 102 by specialized motion planning hardware, such as the reconfigurable collision detection architecture and other embodiments described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS" and in International Patent Application Publication No. WO 2016/122840, filed Jan. 5, 2016, entitled "SPECIALIZED ROBOT MOTION PLANNING HARDWARE AND METHODS OF MAKING AND USING SAME." For example, all or part of such specialized motion planning hardware may be incorporated in or form part of the motion planner 280 and collision assessor 288. Also, implementation of various relevant aspects of perception, planning graph construction, collision detection, and path search are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," and in International Patent Application Publication No. WO 2016/122840, filed Jan. 5, 2016, entitled "SPECIALIZED ROBOT MOTION PLANNING HARDWARE AND METHODS OF MAKING AND USING SAME," Those skilled in the relevant art will appreciate that the illustrated embodiments, as well as other implementations, can be practiced with other system configurations and/or other computing system configurations, including those of robots, hand-held devices, multiprocessor systems, microprocessor-based or programmable consumer electronics, personal computers ("PCs"), networked PCs, mini computers, mainframe computers, and the like. The implementations or portions thereof (e.g., at design time, configuration time, pre-runtime) can be practiced in distributed computing environments where tasks or modules are performed by remote processing devices, which are linked through a communications network. In a distributed computing environment, program modules may be located in both local and remote memory storage devices or media. However, having efficient compute capability for the vehicle 102 is important to allow the vehicle 102 to respond in real time to changing environments. Commonly deployed solutions to this problem fail on both the performance and power fronts. They are too slow to allow high degree-of-freedom vehicles and robots to respond in real time to the environment, and burden the system with powering several CPUs or GPUs. To solve this problem, the computer system 200 shown in the example implementation of FIG. 2 includes a motion planner 280 having a collision assessor 288 on board the vehicle 102 that uses a collision detection microarchitecture that is fully retargetable, such as FPGA 290, However, other programmable collision detection microarchitectures that include an array of programmable logic blocks and a hierarchy of reconfigurable interconnects may be used in various alternative embodiments, such as an ASIC architecture. Through a programming phase, the collision detection microarchitecture may be applied to any vehicle planning problem. The collision assessor 288 may be to achieve collision avoidance with particular objects and/or to seek collision with other objects. The use of reconfigurable processors as the collision assessor 288 effectively removes the limitation that the design be completely specialized to a single vehicle/roadmap pair. A least cost path module allows fast calculation of least cost paths, for example, using a distributed Bellman-Ford strategy.

As noted above, some pre-processing activities may be performed before runtime and thus, in some embodiments, these operations may be performed by remote processing devices, which are linked through a communications network to the vehicle 200 via network interface 260. For example, a programming phase allows configuration of the processor for the problem of interest. In such embodiments, extensive preprocessing is leveraged to avoid runtime computation, Precomputed data regarding the volume in 3D space swept by the vehicle 102 when making the transition in the roadmap from one state to another state represented by edges in the roadmap is sent to the collision assessor 288 of the motion planner 280. The topology of the roadmap may also be mapped onto a reconfigurable fabric of compute units, such as FPGA 290, to enable rapid determination of the least cost path. The mapping step includes programming each physical node of the reconfigurable fabric of compute units with the addresses and edge weights of its logical neighbors. This allows the architecture to be targeted to different roadmap topologies. During the runtime phase, the sensors 282 send perception data to the motion planner 280. The perception data is a stream of which voxels or boxes (described in greater detail below) are present in the current environment. The collision assessor 288 calculates which motions are likely to involve collision and which are not and, upon completion, the results are used by the plan optimizer 292 to determine the least cost path. This may advantageously occur without further communication with the sensors 282 or other external components. The motion planner 280 modifies costs associated with the roadmap accordingly during runtime based on the environment, depending on the goal of the vehicle 102 to avoid or seek collision with particular objects in the environment. The motion planner 280 then runs and returns a resulting path to the actuator system 266. FIG. 2 shows a computer system 200, such as that for autonomous vehicle 102, comprising a motion planner 280 and one or more associated nontransitory machine-readable storage media, such as system memory 214 and computer-readable media 226 associated with disk drive 224. The associated nontransitory computer- or processor-readable storage media, including system memory 214 and computer-readable media 226 associated with disk drive 224, is communicatively coupled to the motion planner 280 via one or more communications channels, such as system bus 216. The system bus 216 can employ any known bus structures or architectures, including a memory bus with memory controller, a peripheral bus, and/or a local bus. One or more sensors 282, an object detector 284, an object behavior predictor 286 and an actuator system 266 are also communicatively coupled to the motion planner 280 via system bus 216. One or more of such components may also or instead be in communication with each other via one or more other communications channels, for example, one or more parallel cables, serial cables, or wireless network channels capable of high speed communications, for instance Universal Serial Bus ("USB") 3.0, Peripheral Component Interconnect Express (PCIe) or Thunderbolt®.

The computer system 200 may also be communicably coupled to remote systems, e.g., desktop computer, laptop computer, ultraportable computer, tablet computer, smartphone, wearable computer, (not shown) that are directly communicably coupled or indirectly communicably coupled to the various components of the computer system 200 via the network interface 260. In implementations, the computer system 200 itself, or a portion thereof, may be remote. Such remote systems may be used to program, configure, control or otherwise interface with or input data to the computer system 200 and various components within the computer system 200. Such a connection may be through one or more communications channels, for example one or more wide area networks (WANs), for instance the Internet, using Internet protocols. As noted above, pre-runtime calculations (e.g., initial roadmap generation) may be performed by a system that is separate from the vehicle 102 or other type of robot, while runtime calculations may be performed on the vehicle 102 since it is important for the system to be able to update or change vehicle velocity to react in real time or near real time (microseconds) and to a changing operational environment 100.

Some aspects of the construction and operation of the various blocks shown in FIG. 2 are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," and/or International Patent Application Publication No. WO 2016/122840, filed Jan. 5, 2016, entitled "SPECIALIZED ROBOT MOTION PLANNING HARDWARE AND METHODS OF MAKING AND USING SAME." As a result, such blocks need not be described in further detail, as they will be understood by those skilled in the relevant art in view of the references incorporated by reference herein.

The computer system 200 may include one or more processing units 212a, 212b (collectively 212), the system memory 214 and the system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. Such ASICs and FPGAs may be used instead of or in addition to the FPGA 290 of the collision assessor 288 to perform a collision assessment on the edges of a planning graph for the vehicle 102. The system memory 214 may include read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may include a disk drive 224, which may be, for example, a hard disk drive for reading from and writing to a hard disk, a flash memory drive for reading from and writing to flash memory devices, an optical disk drive for reading from and writing to removable optical disks, or a magnetic disk drive for reading from and writing to magnetic disks. The computer system 200 may also include any combination of such disk drives in various different embodiments. The disk drive 224 may communicate with the processing units 212 via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the computer system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs; smart cards; etc.

Program modules can be stored in the system memory 214, such as an operating system 236, one or more application programs 238, other programs or modules 240 and program data 242. Application programs 238 may include instructions that cause the processor(s) 212 to perform collision assessment on edges of a planning graph corresponding to environment 100; determine and set a probability of collision for each edge of the planning graph, perform an optimization to identify a path in a planning graph to either avoid collision or cause collision with an agent in the environment 100 (e.g., dynamic object B 112). The optimization to identify a path in a planning graph may include finding a least cost path within the planning graph. The application programs 238 may include instructions that then cause the processor(s) 212 to send signals to the actuator system 266 to cause the vehicle 102 to move according to the motion plan as described herein, Application programs 238 may additionally include one or more machine-readable instructions that cause the processor(s) 212 to perform other operations of perception (via sensors 282), planning graph construction; collision detection, and path search as described herein and in the references incorporated herein by reference.

Application programs 238 may additionally include one or more machine-readable instructions that cause the processor(s) 212 to receive perception information from the sensors 282 that represents the environment 100 in which the vehicle 102 operates; cause the motion planner 280 to use the reconfigurable collision detection architecture hardware of the collision assessor 288 to perform a collision assessment on each of two or more of the edges of a resulting planning graph for the vehicle 102: for each of two or more edges of the resulting planning graph, set a probability of collision based at least in part on the collision assessment; perform an optimization to identify a path in the resulting planning graph with a relatively high potential of a collision with one or more other agents (e.g., dynamic object A 104) in the environment 100 in which the vehicle 102 operates; and cause the actuator system 266 to implement a motion plan with the relatively high potential of a collision with the one or more other agents (e.g., dynamic object A 104) in the environment 100 in which the vehicle 102 operates based at least in part on the optimization. The reconfigurable collision detection architecture hardware may be, for example, an FPGA 290. However, other programmable collision detection microarchitectures that include an array of programmable logic blocks and a hierarchy of reconfigurable interconnects may be used in various alternative embodiments, such as an ASIC architecture.

Application programs 238 may additionally include one or more machine-readable instructions that cause the processor(s) 212 to, based at least in part on an assessment of probability of a collision with one or more dynamic objects (104, 112) in the environment 100 in which the vehicle 102 operates, for a planning graph: assign a weight with a value equal to or greater than zero to each edge of the planning graph if the respective edge has a relatively low respective probability of a collision with one or more dynamic objects (104, 112) in the environment 100; assign a weight with a value less than zero to each edge of the planning graph if the respective edge has a relatively high respective probability of a collision with one or more dynamic objects (104, 112) in the environment 100; and perform an optimization to identify a path in the resulting planning graph with a relatively high potential of a collision with one or more agents, e.g., dynamic objects (104, 112), in the environment 100 in which the vehicle 102 operates.

Application programs 238 may additionally include one or more machine-readable instructions that cause the processor(s) 212 to receive perception information via sensors 282 that represents the environment 100 in which the vehicle 102 operates; cause the motion planner 280 to use the reconfigurable collision detection architecture hardware of the collision assessor 288 to perform a collision assessment on each of two or more of the edges of a planning graph; for each of two or more edges of the planning graph, set a probability of collision based at least in part on the collision assessment; perform an optimization to identify a path in the resulting planning graph that provides a longest route of travel of the vehicle 102 in two-dimensional or three-dimensional space as specified by the path with a relatively low potential of a collision with one or more dynamic objects (e.g., dynamic object B 112) in the environment 100 in which the vehicle 102 operates; and implement a motion plan with the relatively low potential of a collision with one or more dynamic objects (e.g., dynamic object B 112) in the environment 100 in which the vehicle 102 operates based at least in part on the optimization.

Application programs 238 may additionally include one or more machine-readable instructions that cause the processor(s) 212 to perform various other methods described herein, including, but not limited to, those illustrated in FIGS. 6 through 13.

While shown in FIG. 2 as being stored in the system memory 214, the operating system 236, application programs 238, other programs/modules 240, and program data 242 can be stored on associated computer-readable media 226 of the disk drive 224.

The processor(s) 212 may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks shown in FIG. 2 are of conventional design. As a result, such blocks need not be described in further detail herein, as they will be understood by those skilled in the relevant art. The reconfigurable collision detection architecture hardware of the collision assessor 288 of the motion planner 280 may be one of such architectures described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," such as, for example, an architecture which provides, for each edge, an array of "edge modules" having storage mechanisms and comparators which are connected in parallel to a logic gate to perform an "OR" of the outputs of the parallel lines to produce a collision result.

Figure 3:
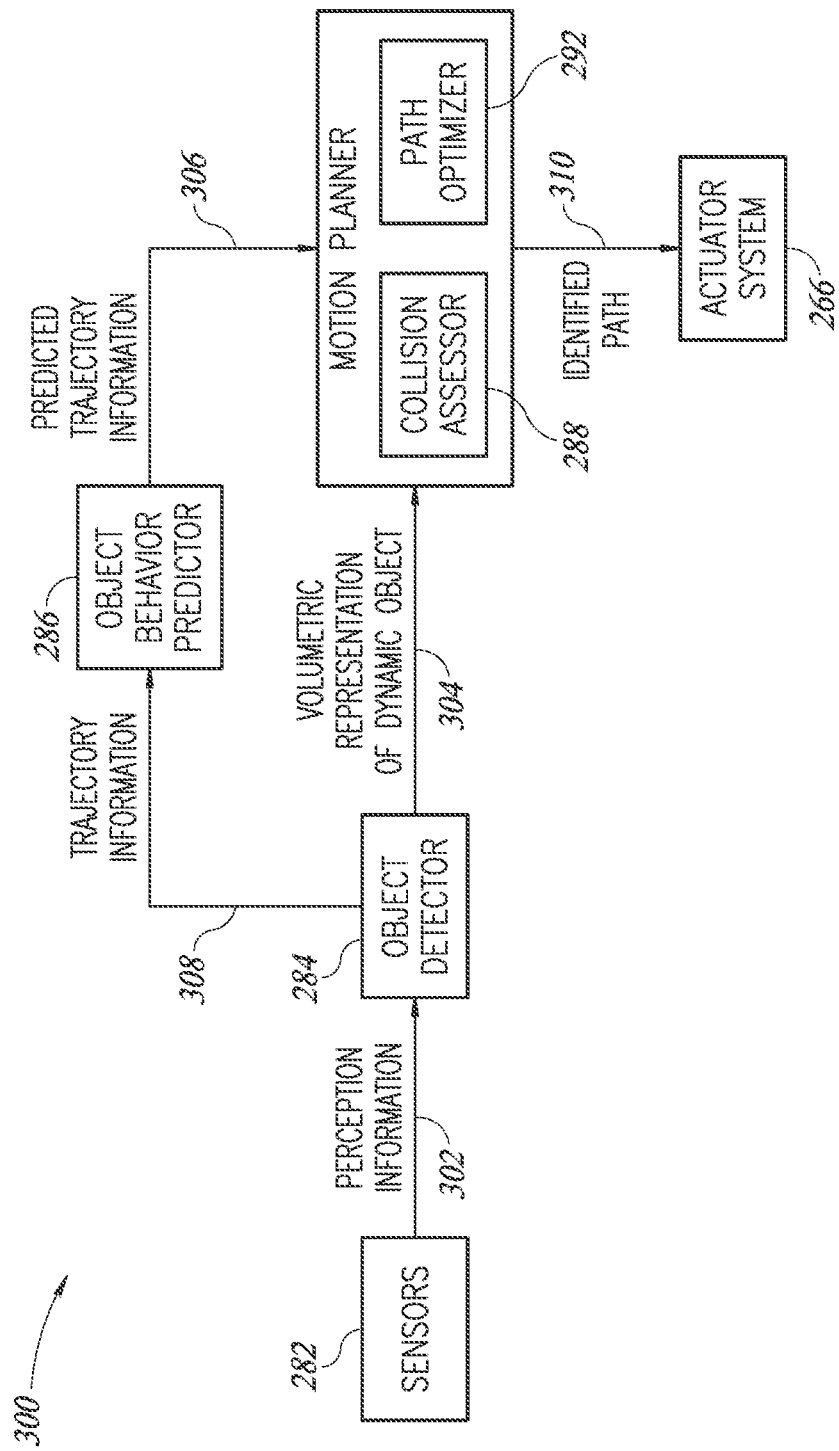
FIG. 3 is a block diagram showing example data flow between various components in the computer system of FIG. 2, according to one illustrated embodiment.

FIG. 3 is a block diagram showing example data flow 300 between various components in the computer system of FIG. 2, according to one illustrated embodiment. One or more sensors 282, such as cameras, laser sensor equipment, audio sensors, etc., either incorporated within the primary agent 102 or in operable communication with the primary agent 102, collect perception information 302 and communicate this to the object detector 284 to produce a model of the environment 100. The object detector 284 extracts trajectory information regarding detected movement of agents, such as dynamic object A 104 and dynamic object B 112 in the environment 100, and communicates such trajectory information 308 to object behavior predictor 286. Based at least in part on the current detected trajectory of the dynamic object (104, 112) in the environment 100 as indicated by the trajectory information 308, object behavior predictor 286 generates one or more predicted trajectories of the dynamic object (104, 112) and communicates this information as part of the predicted trajectory information 306 to the motion planner 280. For example, if the trajectory information 308 indicates dynamic object A 104 is currently on a trajectory heading in a particular direction, the object behavior predictor 286 may predict with 40% probability that dynamic object A 104 will continue in its current trajectory, with 60% probability it does something else.

Various factors may influence the determination of the object behavior predictor 286 of the predicted trajectory of a dynamic object (104, 112) in the environment 100. For example, in some implementations, it may be indicated or determined that a dynamic object (104, 112) has a goal that will affect its future movement within environment 100. As one example, it may be indicated or determined that dynamic object A 104, which is detected to be currently on a trajectory directly away from the primary agent 102, has a goal to get away (and stay away) from primary agent 102. Therefore, the object behavior predictor 286 may take this into consideration when predicting the movement of dynamic object A 104. On the other hand, it may be indicated or determined that dynamic object B 112, which is detected to be currently on a trajectory directly toward the primary agent 102, has a goal to collide with primary agent 102. Therefore, the object behavior predictor 286 may take this into consideration when predicting the movement of dynamic object B 112.

Additionally, the movement of the other agent, e.g., dynamic object (104, 112), may be affected by a change in a trajectory of the primary agent 102. Therefore, the object behavior predictor 286 may take a planned, and not yet implemented or performed, change in a current trajectory of the primary agent 102 into consideration when determining a predicted trajectory of a dynamic object (104, 112) and include such data in the predicted trajectory information 306 provided to the motion planner 280. For example, if it is indicated or determined that dynamic object B 112, which is detected to be currently on a trajectory directly toward the primary agent 102, has a goal to collide with primary agent 102, it may be predicted that if primary agent 102 changes its trajectory, dynamic object B 112 may make a corresponding change in its trajectory to chase primary agent 102. Thus, if primary agent 102 has a goal to reach a destination within environment 100 without colliding with dynamic object B 112 (that is trying to collide with the primary agent 102), then the motion planner 280 may be able to plan a path to the destination to avoid collision with dynamic object B 112, taking into consideration dynamic object B 112 may make a corresponding change in its trajectory to chase primary agent 102 when primary agent 102 changes its trajectory to reach the destination.

Overall, the system performs perception by the use of a combination of the sensors 282 and processing performed by the object detector 284 and object behavior predictor 286 to produce a model of the environment 100. In one implementation, the sensors 282 produce an occupancy grid. An occupancy grid is a data structure representing which regions of space and time contain obstacles in a discretized view of the environment, such as environment 100. Each discretized region of space is termed a "voxel," equivalent to a 3D (volumetric) pixel. In some cases, it is advantageous to represent the objects instead as boxes (rectangular prisms). The regions of space defined by the objects in the environment, including dynamic object A 104, dynamic object B 112 and static object C 108, are represented by such volumetric representations. The volumetric representation of one or more dynamic objects (e.g., dynamic object A 104 and dynamic object B 112), as well as volumetric representation of relevant static objects are communicated to the motion planner 280 from the object detector 284. Construction of an occupancy grid is described in the vast body of published literature available and known to those of ordinary skill in the art of computer vision and sensing.

The motion planner 280 receives perception data, including volumetric representation of dynamic and static objects from the object detector 284 and predicted trajectory information from the object behavior predictor. The motion planner 280 then adjusts a probability of collision along each edge in a planning graph that results in a collision with obstacles in the perception data to account for the predicted trajectories, determines a path considering cost and probability of collision, and outputs the path to the computing system.

The motion planner can include a hardware processor and memory storage as part of a collision assessor 288 within the motion planner 280. For example, FPGA 290 or other array of programmable logic blocks can store a planning graph, also referred to herein as a "roadmap" (see, e.g., FIGS. 4A through 5B). In some implementations, the motion planner 280 includes hardware collision detection circuits, such as FPGA 290, to perform collision detection. In some implementations, the motion planner 280 includes reconfigurable collision detection acceleration. Data regarding the volume in 2D or 3D space swept by the primary agent 102 when making the transition in the roadmap from one state to another state represented by edges in the roadmap can be stored at a memory storage of the collision assessor 288 of the motion planner 280 such that during motion planning, as perception data is received, including predicted trajectory information, the perception data is compared by a hardware processor of the collision assessor 288 to the data stored in the memory storage of the collision assessor 288 (or local system memory 214 of the computer system 200) to determine collisions. During runtime operation, the edges of the planning graph can be assigned information based on one or more variables. For example, in the case where the goal of the primary agent 102 is to collide with dynamic object A 104, based on predictions of where the dynamic object A 104 is headed according to the predicted trajectory information 306, the motion planner 280 will generate a motion plan for primary agent 102 to collide with dynamic object A 104. To do this, the collision assessor 288 evaluates all edges in the planning graph for the likelihood of collision with dynamic object A 104. Note that the environment 100 is the two- or three-dimensional space in which the primary agent 102 operates, and is different than the primary agent's "configuration space" referenced below with respect to the motion planning graphs represented in FIGS. 4A through 5B. The primary agent's configuration space is the space of all configurations of the primary agent 102 that characterize a state of the primary agent, typically a multi-dimensional space, e.g., with more than three dimensions. The edges in the planning graphs 400 and 500 represented in FIGS. 4A through 5B represent transitions between configurations of the primary agent 102. The edges of planning graph 400 do not necessarily represent actual movements in Cartesian coordinates, but they might in some embodiments. The edges of planning graph 400 may also include velocity changes, etc.

Each edge of the planning graphs 400 and 500 represents a transition of the primary agent from one state to another state and has an inherent or operational cost associated with it. For example, the inherent or operational cost may be related to fuel usage, time to execute the associated action, wear and tear associated with the action, and/or other factors. Each edge is assigned an initial weight corresponding to the inherent or operational cost.

The system adjusts the costs of the edges during runtime to represent a probability of collision with a dynamic object (104, 112) in the environment based at least in part on the collision assessment. The system may perform the adjustment of the costs by modifying the initial assigned weight of each edge based on the probability of collision. For example, the system may apply a cost function to each edge to perform a mathematical operation based on the initial weight for that edge (i.e., the weight that corresponds to the inherent cost) to obtain a modified weight. This may be done by adding an additional weight to the initial assigned weight based on the probability of collision, by multiplying the initial assigned weight by a probability of collision factor, or by applying some other function or formula involving the probability of collision and the initial weight that corresponds to the inherent cost.

The inherent or operational costs assigned to edges may also be adjusted during runtime to reflect object-specific costs which represent the relative importance and/or severity of avoiding a collision or achieving a collision with an object. These object-specific costs are independent of the inherent or operational costs and independent of the probability of collision. For example, the object-specific cost associated with a collision with a human may be set significantly higher than the object-specific cost associated with a collision with an inanimate object.

For simplicity of illustration in FIGS. 4A through 5B, all initial weights corresponding to the inherent cost of each edge have been set to zero and adjusted by adding an additional cost indicative of probability of collision. Thus, in one implementation in which the goal of the primary agent 102 is to collide with a dynamic object in the environment (such as dynamic object A 104), an initial weight of 0 combined with a collision probability of zero results in an edge weight of 0, whereas a greater probability of collision results in an edge weight having a larger negative value (i.e., a negative number with a larger absolute value). In another implementation in which the goal of the primary agent 102 is to avoid collision with a dynamic object in the environment (such as dynamic object B 112), a greater probability of collision may result in an adjusted edge weight having a larger positive value.

Once all edge weights of the planning graph have been adjusted, the path optimizer 292 performs a least cost path algorithm from the current position of the primary agent 102 indicated in the planning graph to all possible final points at which the primary agent 102 has run out of fuel/power. The smallest (most negative) path in the planning graph is then selected by the motion planner 280.

Once the path optimizer 292 identifies the path within the planning graph, the motion planner immediately communicates this identified path 310 to the actuator system 266 of the primary agent 102 in real time to generate the corresponding signals to the various motors or movement systems of the primary agent 102 to cause the physical movements of the primary agent 102 to occur to implement the motion plan.

Figure 4A:
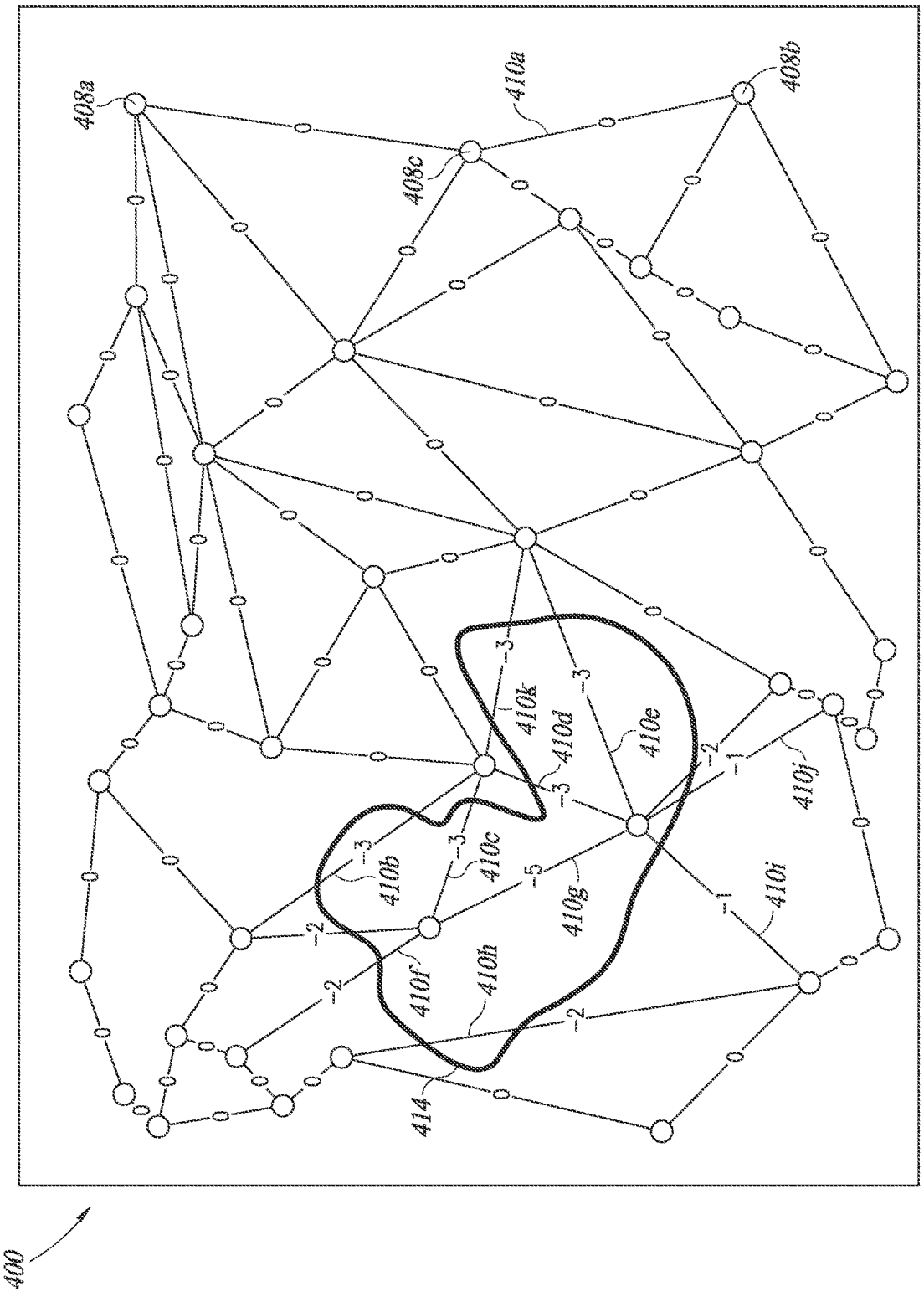
FIG. 4A is an example motion planning graph for the primary agent of FIG. 1 in the case where the goal of the primary agent is to collide with the dynamic object of FIG. 1 that is possibly trying to evade the primary agent, according to one illustrated embodiment.

FIG. 4A is an example motion planning graph 400 for the primary agent 102 of FIG. 1 in the case where the goal of the primary agent 102 is to collide with the dynamic object A 104 of FIG. 1 that may be trying to avoid the primary agent 102, according to one illustrated embodiment. The planning graph 400 comprises a plurality of nodes connected by edges. For example, node 408b and node 408c are connected by edge 410a. Each node represents, implicitly or explicitly, time and variables that characterize a state of the primary agent 102 in the primary agent's configuration space. The primary agent's configuration space (often called C-space), in the present example, is the space of the configurations of the primary agent represented in the planning graph 400 that characterize a state of the primary agent. The edges in the planning graph 400 represent transitions between these configurations of the primary agent 102. The edges of planning graph 400 do not represent actual movements in Cartesian coordinates. For example, each node may represent the configuration of the primary agent, which may include, but is not limited to, the current position, pose, velocity and heading of the primary agent 102. In some embodiments, the acceleration of the primary agent 102 is also represented by the nodes in the planning graph 400.

Each edge of planning graph 400 represents a transition of an object 102 between a respective pair of nodes. For example, edge 410a represents a transition of an object, such as primary agent 102, between two nodes. In particular, edge 410a represents a transition between a state of the primary agent 102 at a particular configuration associated with node 408b and a state of the primary agent 102 associated with node 408c. For example, primary agent 102 may currently be in a particular configuration associated with node 408a. Although the nodes are shown at various distances from each other, this is for illustrative purposes only and this is no relation to any physical distance and there is no limitation on the number of nodes in the planning graph 400. However, the more nodes that are used in the planning graph 400, the more accurately and precisely the motion planner 280 may be able to determine the optimal path according to the goal of the primary agent 102 since there are more paths to select the least cost path from.

There may be instances where it is desirable for primary agent 102 to follow or intercept dynamic object A 104, such as to inspect dynamic object A 104, collect information from dynamic object A 104, exchange information with dynamic object A 104, or even collide with dynamic object A 104 in a game. FIG. 4A shows how a planning graph is used by the motion planner 280 to identify a path for primary agent 102 in the case where the goal of the primary agent 102 is to collide with dynamic object A 104. At this point, the motion planner 280 has received perception information that represents the environment 100 in which the primary agent 102 operates. As described above, collision detection may use voxels or boxes to represent objects in the environment, including primary agent 102 and dynamic object A 104, to the motion planner 280. It should be understood, however, that other object representations may be used.

In one implementation, the environment is discretized into 3D regions of voxels or boxes. Then, all possible collisions between the swept volume of every motion by the primary agent 102 in the environment 100 and the voxels or boxes in the discretized space are precomputed. Examples of such collision assessment are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS" and in International Patent Application Publication No. WO 2016/122840, filed Jan. 5, 2016, entitled "SPECIALIZED ROBOT MOTION PLANNING HARDWARE AND METHODS OF MAKING AND USING SAME."

Due to the fact that dynamic object A 104 is moving in the environment 100, the motion planner 280 also determines a collision assessment of primary agent 102 with dynamic object A 104 for two or more edges in the planning graph 400 based on predictions of where dynamic object A 104 is headed. For each of these edges of the planning graph 400, the motion planner 280 sets a probability of collision of the primary agent 102 with the dynamic object A 104 at particular future times based at least in part on the collision assessment. For example, according to the perception information, dynamic object A 104 is detected to be at a particular position in the environment 100. Based on the current trajectory 110 of dynamic object A 104, the motion planner 280 determines that the dynamic object A 104 will be at a particular position in the environment 100. For nodes in the planning graph 400 where there is a probability that direct movement between them will cause a collision with dynamic object A 104, the motion planner assigns a weight to the edges of the planning graph 400 transitioning between those nodes (edges 410b, 410c, 410d, 410e, 410f, 410g, 410h, 410i, 410j, 410k) indicating the probability of a collision with dynamic object A 104. In the example shown in FIG. 4A, this is denoted as graph portion 414, but does not correspond to a physical area.

For example, the motion planner 280 may, for each of a number of edges of the planning graph 400 that has a respective probability of a collision with dynamic object A 104 below a defined threshold probability of a collision, assign a weight with a value equal to or greater than zero. In the present example, the motion planner 280 has assigned a weight of zero to those edges in the planning graph 400 which, according to the current trajectory of the dynamic object A 104, do not have any (or have very little) probability of a collision with dynamic object A 104. For example, as shown on the planning graph 400, the motion planner 280 has assigned a weight of zero to edge 410a since, according to the current trajectory 110 of dynamic object A 104, there is no (or very little) probability of a collision with dynamic object A 104 at edge 410a. The motion planner 280 then, for each of a number of edges of the planning graph 400 with a respective probability of a collision with dynamic object A 104 in the environment 100 above a defined threshold probability of a collision, assigns a weight with a value less than zero. In the present example, the motion planner 280 has assigned a weight of less than zero to those edges in the planning graph 400 which, according to the current trajectory of the dynamic object A 104, have a higher probability of collision with dynamic object A 104. The particular threshold used for the probability of collision may vary. For example, the threshold may be 40%, 50%, 60% or lower or higher probability of collision. Also, the motion planner 280 assigning a weight with a value less than zero may include assigning a negative weight with a magnitude that corresponds with the respective probability of a collision. For example, as shown in the planning graph 400, the motion planner has assigned a weight of −3 to edges 410b, 410c, 410d and 410e, but has assigned a negative weight with a lower magnitude of −2 to edge 410f, and has assigned a weight with a higher magnitude of −5 to edge 410g. The assigned weights need not be integers.

Figure 4B:
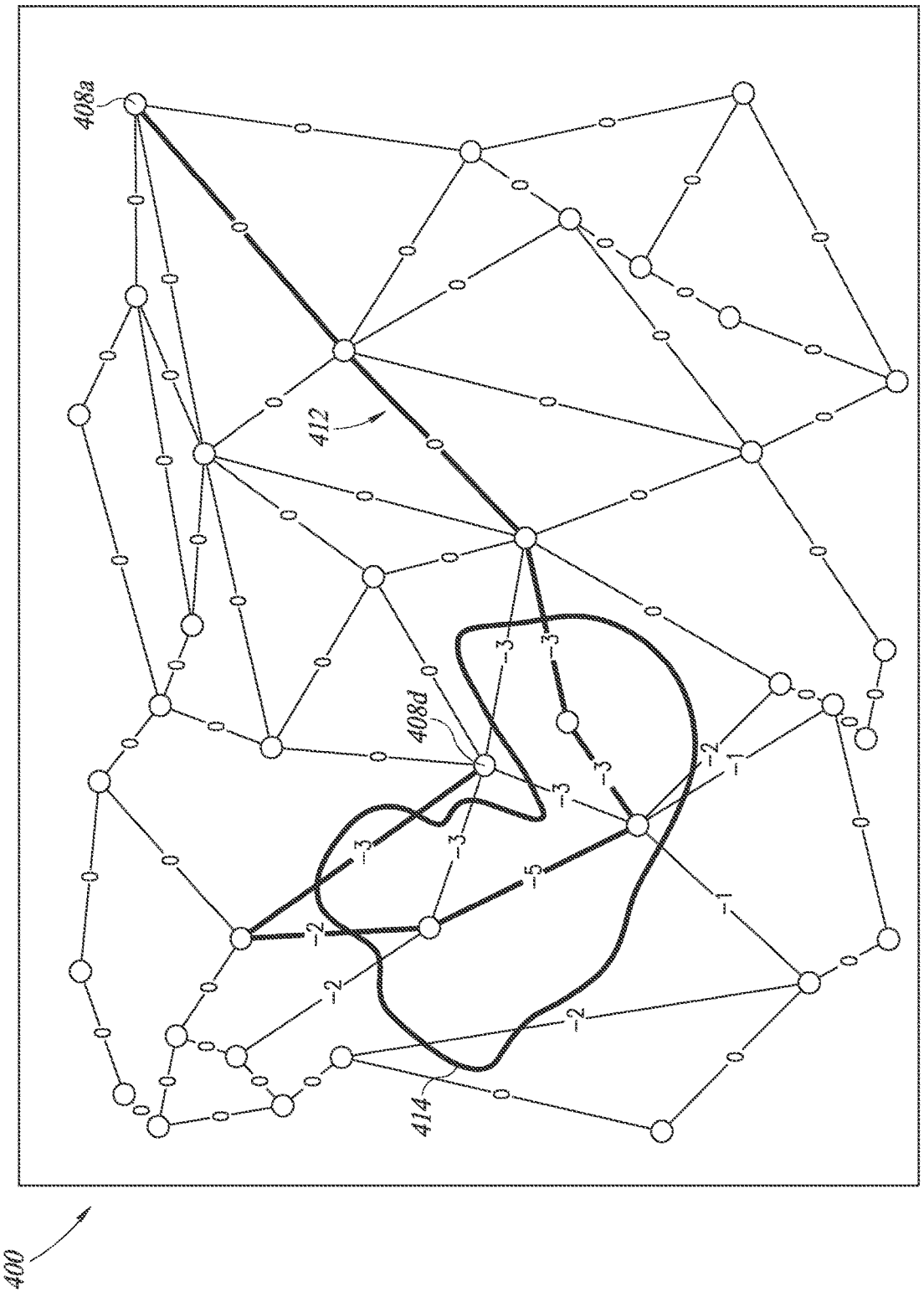
FIG. 4B is an example motion planning graph for the primary agent of FIG. 1 in the case where the goal of the primary agent is to collide with the dynamic object of FIG. 1 that is possibly trying to evade the primary agent and an example path identified in the planning graph for the primary agent to collide with the dynamic object, according to one illustrated embodiment.

FIG. 4B is an example motion planning graph 400 for the primary agent 102 of FIG. 1 in the case where the goal of the primary agent 102 is to collide with the dynamic object A 104 of FIG. 1 that is possibly trying to avoid the primary agent 102, and an example path 412 (including the bolded edges of graph 400 connecting node 408a to 408d) identified in the planning graph 400 for the primary agent 102 to collide with the dynamic object A 104, according to one illustrated embodiment. After the motion planner 280 sets a probability of collision of the primary agent 102 with the dynamic object A 104 based at least in part on the collision assessment, the motion planner 280 performs an optimization to identify a path 412 in the resulting planning graph 400 with a relatively high potential of a collision with the dynamic object A 104.

For example, once all edge weights of the planning graph 400 have been assigned as shown in FIGS. 4A and 4B, the motion planner 280 may perform a least cost path algorithm from the current state of the primary agent 102 in the planning graph 400 to all possible final points at which the primary agent 102 has run out of fuel. The smallest (most negative) path in the planning graph 400 is then selected by the motion planner 280. In the present example, the current state of the primary agent 102 in the planning graph is at node 408a and this smallest (most negative path) is depicted as path 412 in the planning graph 400. Although shown as a path in planning graph 400 with many sharp turns, such turns do not represent corresponding physical turns in a route, but logical transitions between states of the primary agent 102. For example, each node in the identified path 412 may represent a state change with respect to physical configuration of the primary agent 102 in the environment 100, but not necessarily a change in heading of the primary agent 102 corresponding to the angles of the path 412 shown in FIG. 4B.

Various processes for determining the least cost path may be used, including those implementing the Bellman-Ford algorithm, but others may be used, including, but not limited to, any such process in which the least cost path is determined as the path between two nodes in the planning graph 400 such that the sum of the weights of its constituent edges is minimized. This process improves the technology of motion planning for a primary agent, e.g., an autonomous vehicle, for collision with dynamic objects (104, 112) by using planning graphs and collision detection to increase the efficiency and response time to find the best route to collide with the desired object. Additionally, some implementations use the same process of identifying a path for the primary agent 102 with a relatively high potential of a collision with one or more static objects in the environment in which the primary agent 102 operates. In cases where the collision is sought with such static objects, the motion planner 280 may assign a weight having a large negative value for edges of the planning graph 400 having a respective probability of a collision with the static object in the environment 100. In this manner, when the motion planner selects the least cost path during optimization, such paths will be more likely to be selected. However, in such implementations, there is no velocity, trajectory or acceleration of a static object that need be accounted for.

In some implementations, there may be static objects in the environment which the primary agent 102 should avoid colliding with while attempting to collide with dynamic object A 104. In such a case, setting the probability of collision for the edges of the planning graph 400 based on the collision assessment includes assigning weights (e.g., by modifying/adjusting an initial weight) to avoid collision with such static objects accordingly. For example, the motion planner 280 assigns a weight with a value of infinity for each of a number of edges of the planning graph 400 that has a respective probability of a collision with the static object in the environment 100. In this manner, when the motion planner selects the least cost path during optimization, such paths having edge weights set to infinity will be avoided since they would result in collision with the static object if traversed.

The motion planner 280 may perform the optimization to identify a path in the resulting planning graph 400 with a highest potential of a collision with dynamic object A 104 along an entire route of the primary agent 102. In some implementations, the length of the route may be defined at least in part by when the primary agent 102 runs out of fuel/power. A variable indicating the "remaining fuel" of the primary agent 102 may be stored by the computer system 200. In some implementations, the motion planner 280 may perform the optimization to identify a path in the resulting planning graph 400 with a relatively high potential of a collision in a shortest relative amount of time with one or more objects in the environment in which the primary agent 102 operates. Alternatively, in some implementations, the motion planner 280 may perform the optimization to identify a path in the resulting planning graph 400 with a longest duration of travel as specified by the path with a relatively high potential of a collision with dynamic object A 104.

The path in the planning graph 400 may also be identified based on a change or predicted change in the trajectory 110 of dynamic object A. At each change or predicted change in the trajectory 110 of dynamic object A 104, the collision assessment and optimization process may be run again in real time or near real time. Also, the resulting planning graph 400 may have or store associated data which represents the physical or performance constraints of the primary agent 102 and/or dynamic object (104, 112), the acceleration, the pitch, the roll and the yaw of the primary agent 102, and in some implementations, also of the dynamic object A 104. The optimization to identify the path may then be performed based on such variables. For example, if the pitch, the roll and/or the yaw of the primary agent dynamic object A 104 changes, this may indicate a change (or result in a predicted change) in trajectory of dynamic object A 104.

Figure 5A:
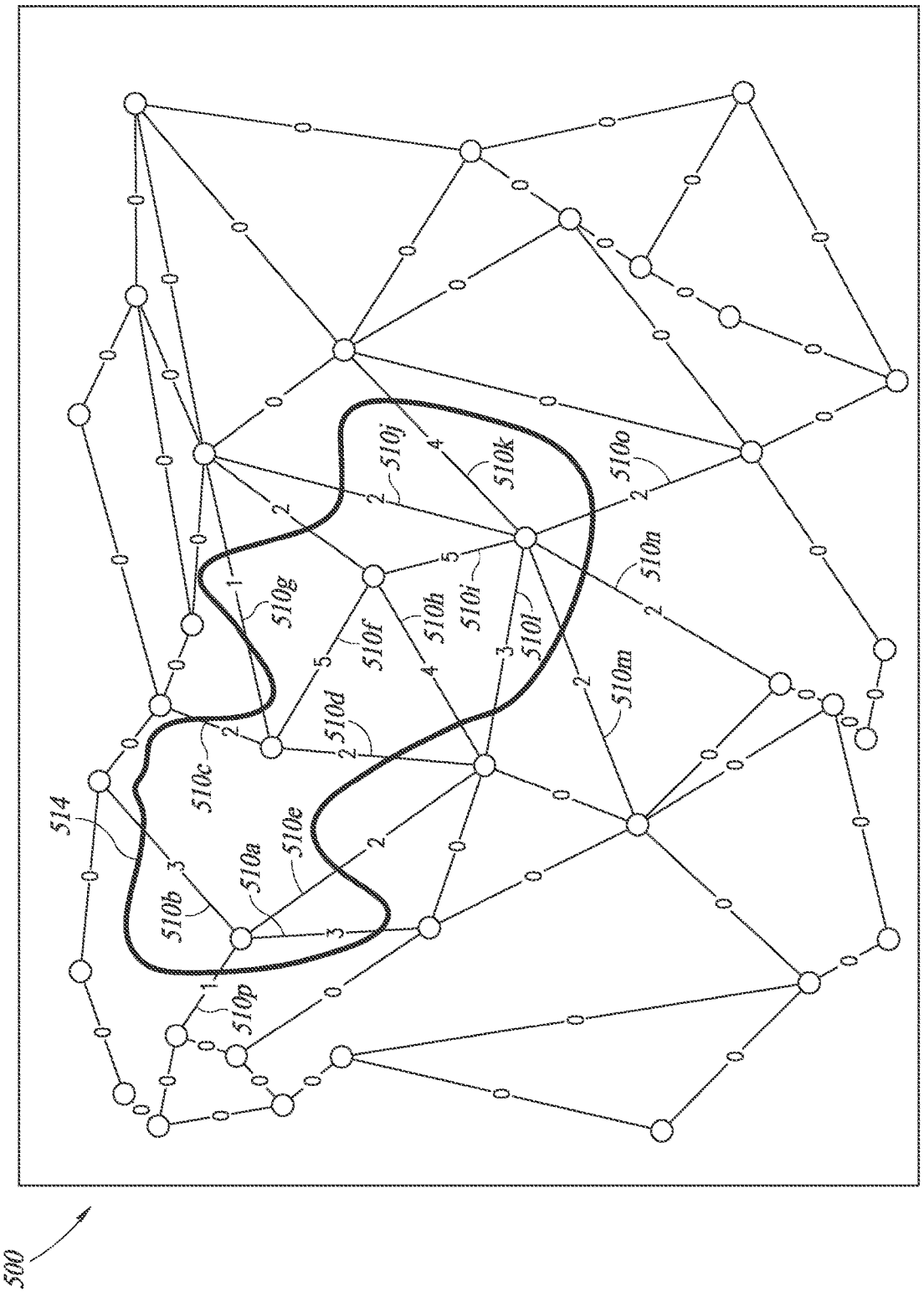
FIG. 5A is an example motion planning graph for the primary agent of FIG. 1 in the case where the goal of the primary agent is to avoid collision with the dynamic object of FIG. 1 that is approaching the primary agent, according to one illustrated embodiment.

FIG. 5A is an example motion planning graph 500 for the primary agent 102 of FIG. 1 in the case where the goal of the primary agent 102 is to avoid collision with the dynamic object B 112 of FIG. 1 that is approaching the primary agent 102, according to one illustrated embodiment. Similar to planning graph 400, planning graph 500 respectively comprises a plurality of nodes connected by edges. Each node represents, implicitly or explicitly, time and variables that characterize a state of the primary agent 102. For example, each node may represent the configuration of the primary agent, which may include, but is not limited to, the current position, pose, velocity and heading of the primary agent 102. In some embodiments, the acceleration of the primary agent 102 is also represented by the nodes in the planning graph 500.

There may be instances where it is desirable for primary agent 102 to avoid dynamic object B 112, such as to avoid collision with dynamic object B 112. FIG. 5A shows how a planning graph is used by the motion planner 280 to identify a path for primary agent 102 in the case where the goal of the primary agent 102 is to avoid collision with or evade dynamic object B 112, and dynamic object B 112 is attempting to collide with primary agent 102, such as in a game. At this point, the motion planner 280 has received perception information that represents the environment 100 in which the primary agent 102 operates. As described above, collision detection may use voxels or boxes to represent objects in the environment, including dynamic object B 112. Voxels or boxes may also be used to represent primary agent 102 to the motion planner 280. It should be understood, however, that other object representations may be used. In one implementation, the environment is discretized into 3D regions of voxels or boxes. Then, all possible collisions between the swept volume of every motion in the planning graph 500 by the primary agent 102 in the environment 100 and the voxels or boxes in the discretized space are precomputed.

Due to the fact that dynamic object B 112 is moving in the environment 100, the motion planner 280 also determines a collision assessment of primary agent 102 with dynamic object B 112 for two or more edges in the planning graph 500 based on predictions of where dynamic object B 112 is headed. For each of these edges of the planning graph 500, the motion planner 280 sets a probability of collision of the primary agent 102 with the dynamic object B 112 at particular future times based at least in part on the collision assessment. For example, according to the perception information, dynamic object B 112 is detected to be at a particular position in the environment 100. Based on the current trajectory 106 of dynamic object B 112, the motion planner 280 determines that the dynamic object B 112 will be at a particular position in the environment 100. For nodes in the planning graph 500 where there is a probability that direct movement between them will cause a collision with dynamic object B 112, the motion planner assigns a weight to the edges of the planning graph 500 transitioning between those nodes (edges 510*a*, 510*b*, 510*c*, 510*d*, 510*e*, 510*f*, 510*g*, 510*h*, 510*i*, 510*j*, 510*k*, 510*l*, 510*m*, 510*n*, 510*o* and 510*p*) indicating the probability of a collision with dynamic object B 112. In the example shown in FIG. 5A, this is denoted as graph portion 514, but does not correspond to a physical area.

For example, the motion planner 280 may, for each of a number of edges of the planning graph 500 that has a respective probability of a collision with dynamic object B 112 above a defined threshold probability of a collision, assign a weight with a value greater than zero. In the present example, the motion planner 280 has assigned a weight of zero to those edges in the planning graph 500 which, according to the current trajectory of the dynamic object B 112, do not have any (or have very little) probability of a collision with dynamic object B 112. The motion planner 280 then, for each of a number of edges of the planning graph 500 with a respective probability of a collision with dynamic object B 112 in the environment 100 above the defined threshold probability of a collision, assigns a weight with a value greater than zero. In the present example, the motion planner 280 has assigned a weight of greater than zero to those edges in the planning graph 500 which, according to the current trajectory of the dynamic object B 112, have a higher probability of collision with dynamic object B 112. The particular threshold used for the probability of collision may vary. For example, the threshold may be 40%, 50%, 60% or lower or higher probability of collision. Also, the motion planner 280 assigning a weight with a value greater than zero may include assigning a weight with a magnitude greater than zero that corresponds with the respective probability of a collision. For example, as shown in the planning graph 500, the motion planner has assigned a weight of 5 to edges 510*f* and 510*i* that have a higher probability of collision, but has assigned a weight with a lower magnitude of 1 to edges 510*p* and 510*g*, which the motion planner 280 determined have a much lower probability of collision.

Figure 5B:
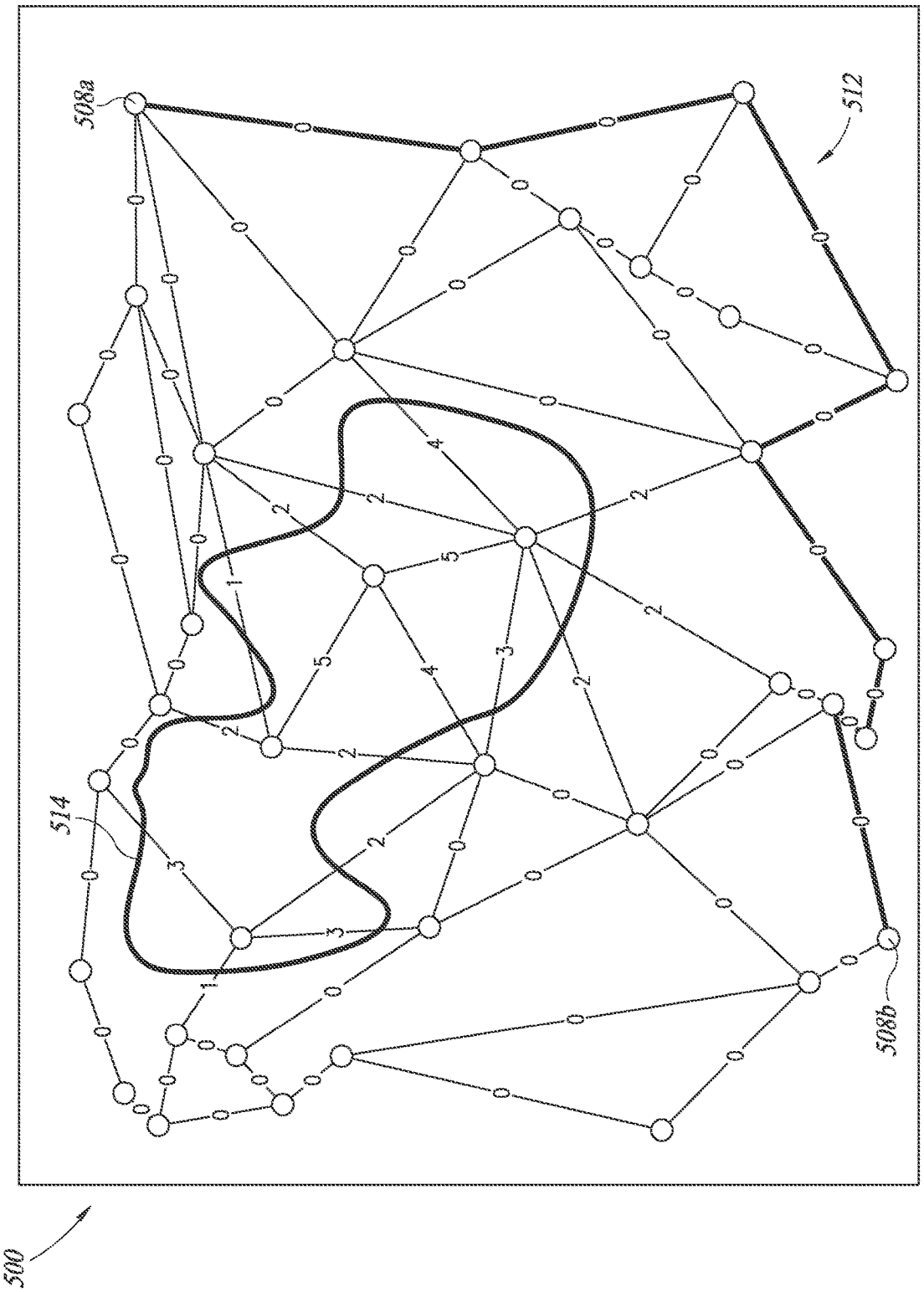
FIG. 5B is an example motion planning graph for the primary agent of FIG. 1 in the case where the goal of the primary agent is to avoid collision with the dynamic object of FIG. 1 that is approaching the primary agent and an example path identified in the planning graph for the primary agent to avoid collision with the dynamic object, according to one illustrated embodiment.

FIG. 5B is an example motion planning graph 500 for the primary agent 102 of FIG. 1 in the case where the goal of the primary agent 102 is to avoid collision with the dynamic object B 112 of FIG. 1 that is approaching the primary agent, and an example path 512 (including the bolded edges of graph 500 connecting node 508*a* to 508*b*) identified in the planning graph 500 for the primary agent 102 to avoid collision with the dynamic object B 112, according to one illustrated embodiment. After the motion planner 280 sets a probability of collision of the primary agent 102 with the dynamic object B 112 based at least in part on the collision assessment, the motion planner 280 performs an optimization to identify a path 512 in the resulting planning graph 500 that provides a longest route of travel of the primary agent 102 as specified by the path with a relatively low potential of a collision with dynamic object B 112.

In one implementation, once all edge weights of the planning graph 500 have been assigned as shown in FIGS. 5A and 5B, the motion planner 280 may perform a calculation to determine the longest route of travel such that dynamic object B 112 would run out of fuel before colliding with the primary agent 102. For example, once all edge weights of the planning graph 500 have been assigned as shown in FIGS. 5A and 5B, the motion planner 280 may perform a least cost path algorithm from the current state of the primary agent 102 in the planning graph 500 to all possible final points at which the primary agent 102 has run out of fuel/power. The longest route (e.g., in time or distance) with the least cost (closest to zero) path in the planning graph 500 is then selected by the motion planner 280. However, the longest route and least cost (closest to zero) path in the planning graph 500 are often in competition. In the case in which the longest route is desired, finding the least cost path in the planning graph 500 is not as high a priority as selecting a path with the least probability of collision. In the present example, the current state of the primary agent 102 in the planning graph is at node 508*a*, and this path is depicted as path 512 in the planning graph 500.

In some implementations, there may be a secondary goal for the primary agent 102 to arrive at a particular destination (while avoiding collision with dynamic object B 112). In this case, the optimization may include performing a least cost path algorithm from the current state of the primary agent 102 in the planning graph 500 to the desired destination. In one embodiment, the goal of primary agent 102 is to maximize the time without a collision with dynamic object B 112 such that, for example, dynamic object B 112 runs out of fuel before colliding with the primary agent 102. The goal of primary agent 102 in one example embodiment is to minimize the probability of collision with dynamic object B 112 between the current time and time of arrival of the primary agent 102 at a desired destination or achieving a particular goal, or between the current time and when dynamic object B 112 runs out of fuel. This process improves the technology of motion planning for avoiding collision with dynamic objects (104, 112) by using planning graphs and collision detection to increase the efficiency and response time to find the best route to avoid collision with the dynamic object (104, 112) that may be seeking to collide with the autonomous primary agent. Additionally, some implementations use the same process of identifying a path for the primary agent 102 with a zero potential of a collision with one or more static objects in the environment in which the primary agent 102 operates. In cases where the collision is to be avoided with such static objects, the motion planner 280 assigns a weight a value of infinity for each of a number of edges of the planning graph 500 that has a respective probability of a collision with the static object in the environment 100. In this manner, when the motion planner selects the least cost path during optimization, such paths having edge weights set to infinity will be avoided since there is no uncertainty that there will be collision with the static object if that edge is traversed. In such implementations, there is no velocity or trajectory of a static object to be accounted for.

In some implementations, there may be multiple other agents, e.g., dynamic objects (104, 112), some of which primary agent 102 has a goal to avoid and others which primary agent 102 has a goal to intercept or collide with. In such implementations, the processes described herein for the primary agent 102 to collide with dynamic objects (104, 112) and the processes described herein for the primary agent 102 to avoid collision with dynamic objects (104, 112) may be implemented concurrently, simultaneously or otherwise in conjunction with each other. For example, some objects may be identified as those to collide with and others may be identified as objects to avoid collision with. The motion planner 280 then runs optimizations as described herein, accordingly taking into consideration the trajectories and perception information corresponding to the dynamic and static objects and whether such objects are to be collided with or avoided. In such a case, setting the probability of collision for the edges of the planning graph based on the collision assessment includes assigning weights (e.g., by modifying/adjusting an initial weight) to collide or avoid collision accordingly.

The motion planner 280 may perform the optimization to identify a path in the resulting planning graph 500 with a lowest potential of a collision with dynamic object B 112 along an entire route of the primary agent 102. In some implementations, the length of the route may be defined at least in part by when the primary agent 102 runs out of fuel/power, A variable indicating the remaining fuel or power of the primary agent 102 may be stored by the computer system 200. In some implementations, the motion planner 280 may perform the optimization to identify a path in the resulting planning graph 500 with a longest duration of travel as specified by the path with a relatively low potential of a collision with dynamic object B 112. The path may also be identified based on a change or predicted change in the trajectory 106 of dynamic object B 112. At each change or predicted change in the trajectory 106 of dynamic object B 112, the collision assessment and optimization process may be run again in real time or near real time. Also, the resulting planning graph 500 may have data which represents the physical or performance constraints of the primary agent and/or dynamic object, the acceleration, the pitch, the roll and the yaw of the primary agent 102, and in some implementations, also of the dynamic object B 112. The optimization to identify the path may then be performed based on such variables. For example, if the pitch, the roll and/or the yaw of dynamic object B 112 changes, this may indicate a change (or result in a predicted change) in trajectory of dynamic object B 112.

The motion planner 280 can be programmed for a wide range of autonomous vehicles and robots (with and without appendage(s)) and expected task scenarios. The motion planner 280 can be reused, or reprogrammed, for different vehicles or robots or the motion planner 280 can be designed for a specific vehicle or robot, One type of robot is an autonomous vehicle, such as the autonomous vehicle described herein.

Figure 6:
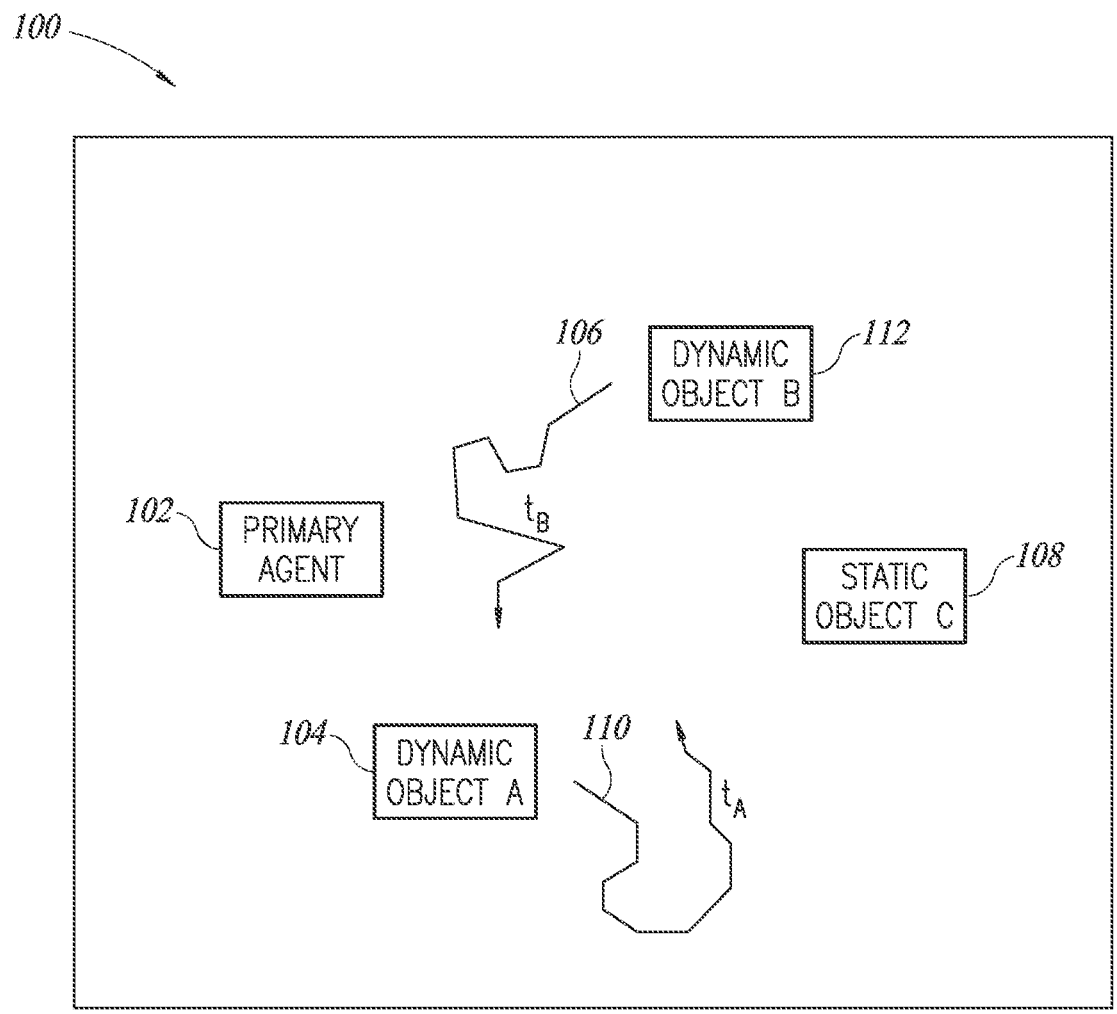
FIG. 6 is a schematic view of an environment in which a primary agent (e.g., autonomous vehicle, robot with or without appendage(s), etc.) may operate and in which other agents have known trajectories, according to one illustrated embodiment.

FIG. 6 is a schematic view of an environment 100 in which a primary agent 102 (e.g., autonomous vehicle, robot with or without appendage(s), etc.) may operate and in which other agents, e.g., dynamic object A 104 and dynamic object B 112, have known trajectories (e.g., $t_A$ 110 and $t_B$ 106, respectively), according to one illustrated embodiment. In this scenario, the trajectory of the primary agent 102 can be planned taking into account the intentions of the other agents, i.e., their trajectories as a function of time, in the environment 100, rather than merely accounting for their present trajectory. This, in turn, allows for conditional action on the part of the primary agent 102 in response to the changing trajectories of the other agents, e.g., dynamic object A 104 and dynamic object B 112. For example, if a person runs into a road, in the environment 100 of the primary agent 102, the action to be taken with respect to the trajectory of the primary agent 102 will depend on whether the person keeps running or whether they stop. In other words, knowing the trajectory of the agent, e.g., the person in this example, allows for a solution which takes into account changing circumstances, rather than planning a complete path through the lattice independently of what the other agents in the environment 100 may do. In addition, this approach avoids double counting of collisions, such as may occur when an entire set of trajectories is applied to edges of a motion graph before a path is planned.

Figure 7:
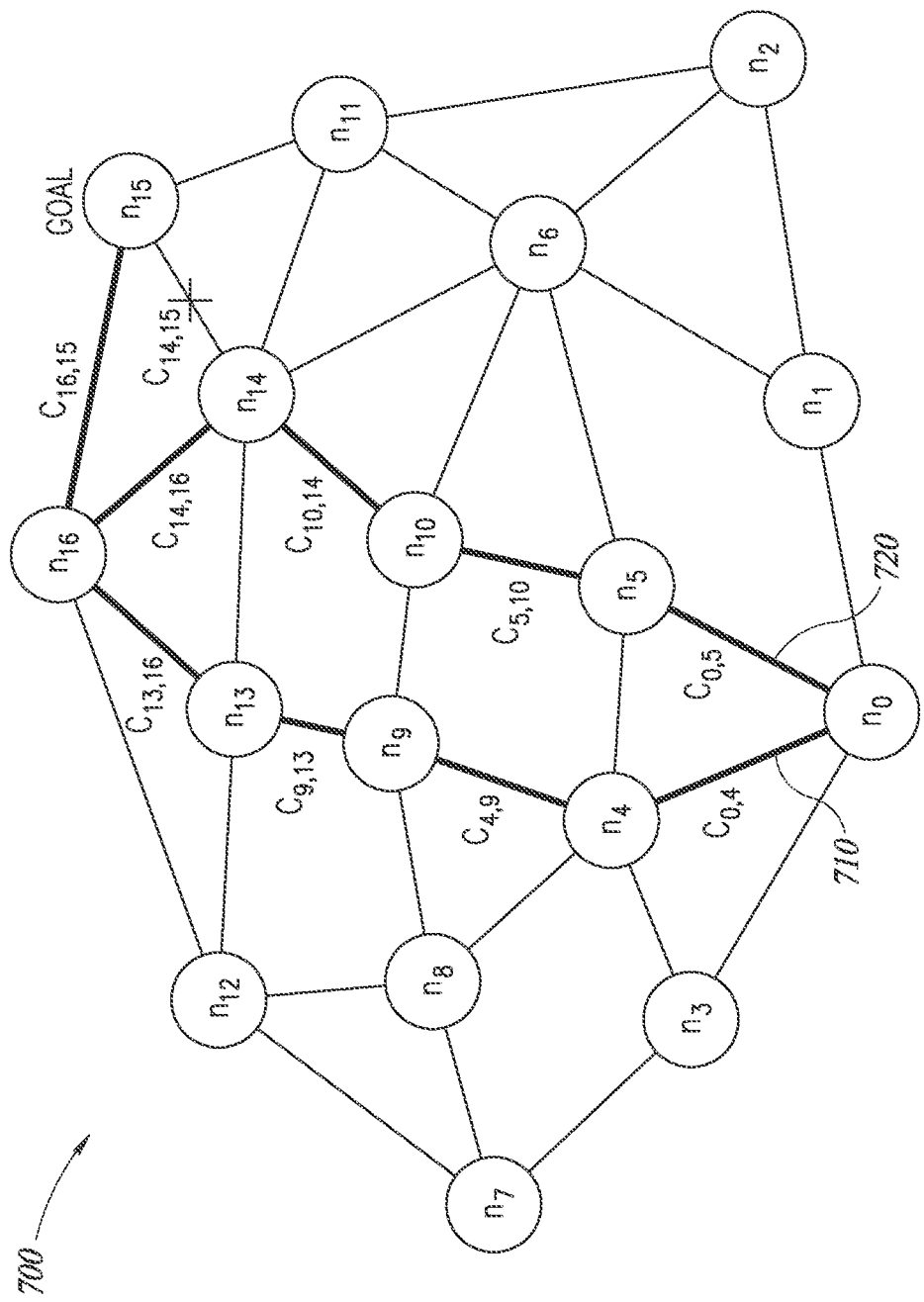
FIG. 7 is an example motion planning graph for the primary agent of FIG. 6 showing an example of a least-cost path through each of two candidate nodes with costs determined based on the known trajectories of the other agents, according to one illustrated embodiment.

FIG. 7 is an example motion planning graph 700 for the primary agent 102 of FIG. 6. In embodiments, each node (e.g., $n_0$, $n_1$, $n_2$, . . . ) in the lattice has an associated value (i.e., cost) based on a cost associated with edges of the lattice (e.g., $c_{0,4}$, $c_{0,5}$, etc.) between the node and the goal (i.e., final state) of the primary agent 102.

The lattice is initialized by performing static background collision detection to find edges which are in collision with static objects (e.g., static object C 108). In such a case, a cost may be assigned (or a cost function may be applied) to an edge which has been determined to result in a collision with a static object (e.g., edge between $n_{14}$ and $n_{15}$), resulting in a relatively high cost. For example, the cost may be set to infinity, thereby effectively preventing the trajectory of the primary agent 102 from including the edge identified as colliding with the static object. In a second aspect of the initialization of the lattice, a cost to the goal is determined for each node based, e.g., on a least-cost path from the node in question to the goal node (e.g., $n_{15}$). For example, the cost of node $n_{13}$ may be determined by the cost ($c_{13,16}$) of the edge between $n_{13}$ and $n_{16}$ and the cost ($c_{16,15}$) of the edge between $n_{16}$ and $n_{15}$.

Motion planning for the primary agent 102 using the graph 700 depicted in FIG. 7 may be performed beginning at time T=i, at a node denoted n (e.g., no). As explained above, motion planning takes into account the intentions of the other agents, e.g., dynamic objects (104, 112), in the environment 100 of the primary agent 102. The intentions are sampled, e.g., using behavioral models based on probabilistic functions, to produce a trajectory t for each agent $A_j$, resulting in a set S of trajectories. As explained in further detail below, least cost paths are determined as each trajectory t is individually applied to the graph 700 and then an averaging of costs is performed. This is in contrast to approaches in which an entire set of trajectories is applied to a motion planning graph before a least cost path is determined.

For each trajectory t in S, a determination is made as to which edges, if any, in the motion planning graph 700 collide with the trajectory, i.e., which edges will result in the primary agent 102 colliding with another agent corresponding to the trajectory t. The cost values of these edges are modified, e.g., by applying a cost function that determines a cost associated with a collision, such as, for example, a function which results in a high value being assigned to the edge in collision.

After the cost of the edges of the graph 700 have been modified based on a trajectory t, a cost is computed for each of the candidate nodes n', i.e., the nodes reachable from the current node n (e.g., $n_0$) in a single time step (i.e., at time T=i+1). The cost of a candidate node n' (e.g., $n_3$, $n_4$, $n_5$, and $n_1$) is computed by finding a least-cost path from the current node n (e.g., $n_0$) to the goal (e.g., $n_{15}$) passing through the candidate node n'. FIG. 7 shows an example of a first least-cost path 710 from node no to the goal (node $n_{15}$) which passes through candidate node $n_4$ and a second least-cost path 720 from node no to the goal which passes through candidate node $n_5$. In these examples, the cost of node $n_4$, for trajectory t, would be the sum of the edges along the first path (e.g., $c_{0,4}$, $c_{4,9}$, $c_{9,13}$, $c_{13,16}$, $c_{16,15}$).

The costs of the candidate nodes n' are computed in the above manner for each trajectory ($t_1$, $t_2$, ... $t_m$) in the set of trajectories S, each trajectory corresponding to an agent $A_j$ (j=1 to m), where m is the number of other agents. The costs are averaged over the set of trajectories S to provide an average cost for each candidate node n'. The candidate node n' with the lowest average cost is selected as the next node for primary agent. Therefore, at time T=i+1, the candidate node n' with the lowest average cost becomes the current node n for the next time step, T=i+2. This continues until the primary agent 102 reaches the goal node (e.g., $n_{15}$), i.e., achieves the state represented by the goal node.

Figure 8A:
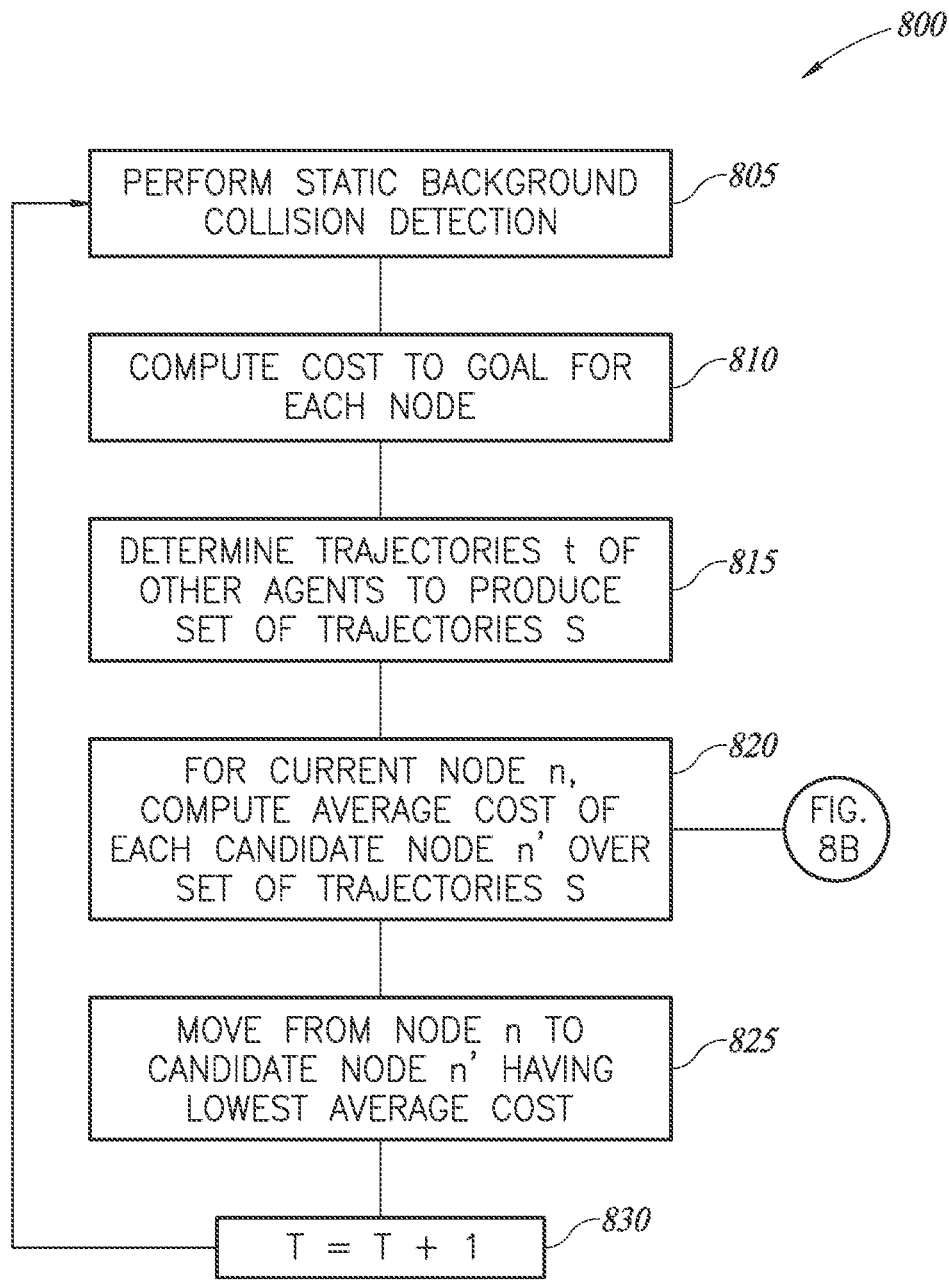
FIG. 8A is a flow diagram showing a method to identify paths for a primary agent via planning graphs, the paths passing through a candidate node having a lowest average cost taking into account known trajectories of other agents, according to one illustrated embodiment.

FIG. 8A is a flow diagram showing a method 800 to identify paths for primary agents via planning graphs, the paths passing through a candidate node having a lowest average cost taking into account known trajectories of other agents, according to one illustrated embodiment. At 805, the system performs static background collision detection. At 810, the cost to the goal for each node is computed. As discussed above with respect to FIG. 7, each node (e.g., $n_0$, $n_1$, $n_2$ ... ) in the lattice has an associated value (i.e., cost) based on a cost associated with edges of the lattice (e.g., $c_{0,4}$, $c_{0,5}$, etc.) between the node and the goal (i.e., final state) of the primary agent 102. The costs associated with the edges of the lattice are determined based on, inter alia, the inherent costs associated with movement between two nodes along the edge in question (e.g., fuel and/or energy costs). In implementations, the cost to the goal is determined for each node based on a least-cost path from the node in question to the goal node (e.g., $n_{15}$). At 815, the system determines trajectories t of other agents $A_j$ in the environment 100 of the primary agent. At 820, for the current node n, i.e., the current position of the primary agent in the motion planning graph 700, the system computes an average cost of each candidate node n' over a set of trajectories S, as explained in further detail in FIG. 8B and its corresponding description below. At 825, the state (e.g., pose) of the primary agent 102 in the motion planning graph 700 moves from node n to a candidate node n' having the lowest average cost. At 830, the time is incremented and the method 800 is repeated for the next time step.

Figure 8B:
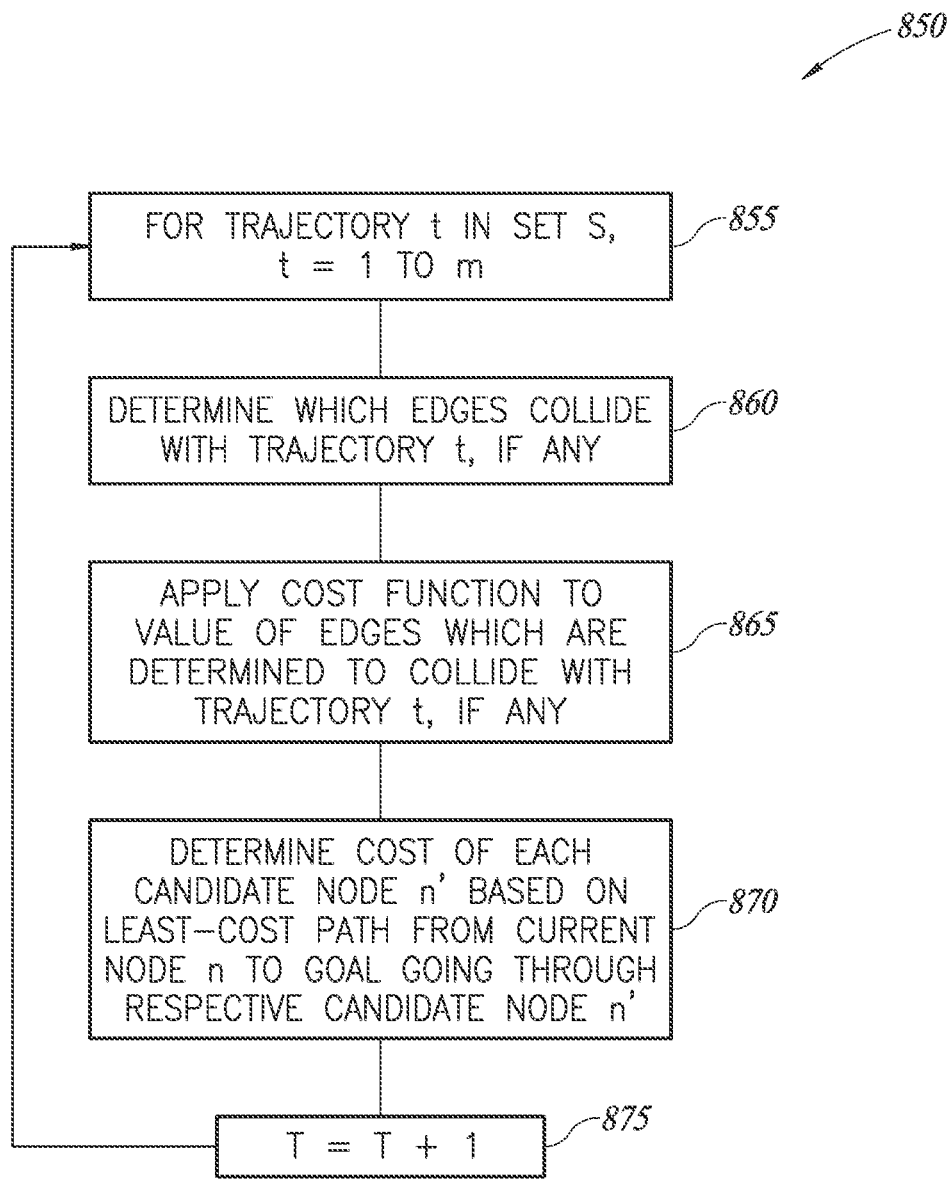
FIG. 8B is a flow diagram showing a method useful to compute a cost for each candidate node averaged over set of known trajectories in the method of FIG. 8A, according to one illustrated embodiment.

FIG. 8B is a flow diagram showing a method 850 useful to compute a cost for each candidate node averaged over set of known trajectories in the method of FIG. 8A (see block 820), according to one illustrated embodiment. At 855, a loop is initiated to consider each trajectory t in the set of trajectories S, for t=1 to m, where m is the number of trajectories. At 860, the system determines which edges of the motion planning graph 700 collide with trajectory t, if any. At 865, the system applies a cost function to values of the edges which are determined to collide with trajectory t, if any. At 870, the system determines the cost of each candidate node n' based on a least-cost path from node n to the goal going through the respective candidate node n'. At 875, an index t identifying the trajectory is incremented and the method 850 is repeated until all of the trajectories have been processed.

Figure 9:
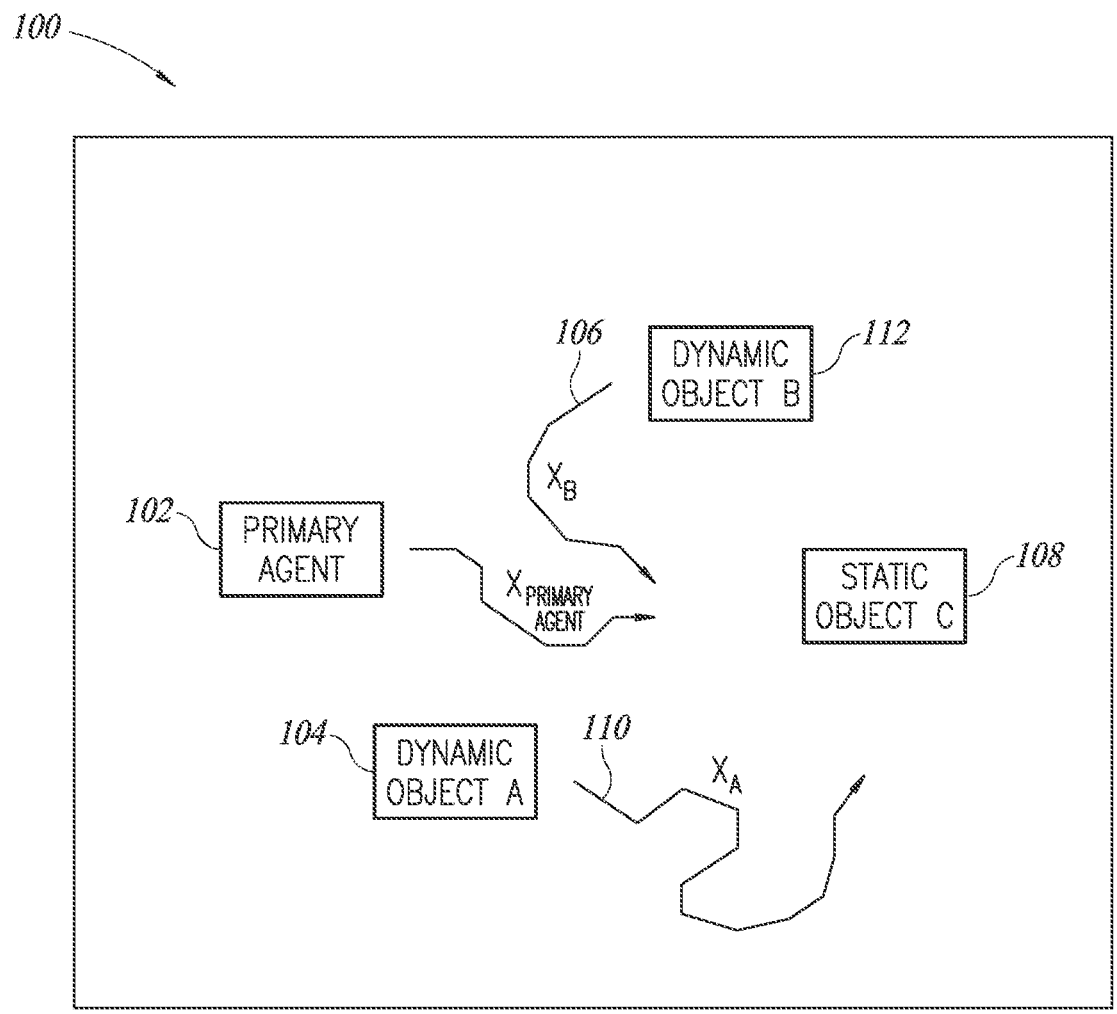
FIG. 9 is a schematic view of an environment in which a primary agent (e.g., autonomous vehicle, robot with or without appendage(s), etc.) may operate and in which the primary agent and other agents have interdependent trajectories, according to one illustrated embodiment.

FIG. 9 is a schematic view of an environment 100 in which a primary agent 102 (e.g., autonomous vehicle, robot with or without appendage(s), etc) may operate and in which the primary agent 102 and other agents (e.g., dynamic object A 104 and dynamic object B 112) have interdependent trajectories, according to one illustrated embodiment. The trajectories of the dynamic objects (104, 112) may be modeled probabilistically (e.g., $X_A$, and $X_B$). In disclosed embodiments, dynamic object A 104 and dynamic object B 112 can react to the movements of both the primary agent 102 and all the other agents in the environment (including each other). Accordingly, a behavioral model of each agent is developed which treats agent intentions as modeling latent policies or goals, rather than simple trajectories. The latent policies or goals are in a form which can be sampled to determine how the agent would react to other agent trajectories. When the primary agent 102 is at a node n at a current time T, the system seeks to determine where the other agents will be in the future. The policies of the other agents are first simulated forward until the current time T based on the primary agent's path from its start node to node n and accounting for the probabilistic reactions of the secondary agents to the actions of the primary agent as well as the actions of all of the secondary agents. Thus, the probabilistic function of a given secondary agent is representative of the at least some of the actions of the primary and the secondary agents up until a current time. This produces a result indicating the space the other agents occupy at the current time T. This is the case because the location of another agent at the current time T depends on the trajectory followed by all other agents and the primary agent 102 up to current time T.

Figure 10:
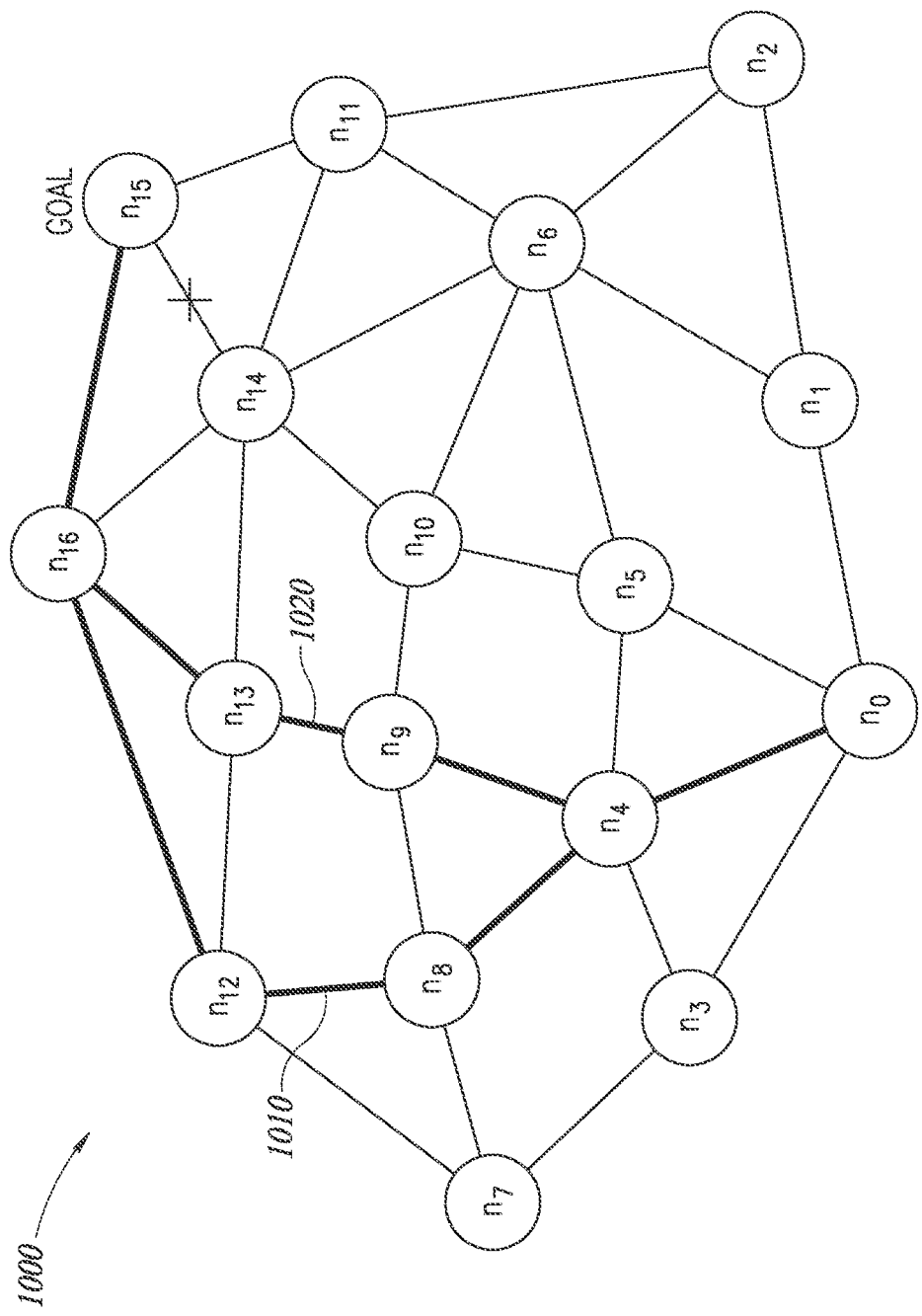
FIG. 10 is an example motion planning graph for the primary agent of FIG. 9 showing an example of a first least-cost path and a second least-cost path determined based on trajectories of the other agents computed from probabilistic models after a planned movement of the primary agent along the first least-cost path from a current node to a candidate node, according to one illustrated embodiment.

FIG. 10 is an example motion planning graph 1000 for the primary agent 102 of FIG. 9, showing an example of a first least-cost path 1010 and a second least-cost path 1020. The second least-cost path 1020 is determined based on probabilistically-determined trajectories of the other agents computed after a planned movement of the primary agent 102 along the first least-cost path 1010 from a current node (e.g., $n_0$) to a candidate node (e.g., $n_4$), according to one illustrated embodiment.

In embodiments, each node (e.g., $n_0$, $n_1$, $n_2$ ... ) in the lattice has an associated value (i.e., cost) based on a cost associated with edges of the lattice between the node and the goal of the primary agent. The lattice is initialized by performing static background collision detection to find edges that are in collision with static objects (e.g., static object C 108). In such a case, a cost may be assigned (or a cost function may be applied) to an edge which has been determined to result in a collision with a static object (e.g., edge between $n_{14}$ and $n_{15}$), resulting in a relatively high cost. For example, the cost may be set to infinity, thereby effectively preventing the trajectory of the primary agent 102 from including the edge identified as colliding with the static object. In a second aspect of the initialization of the lattice, a cost to the goal is determined for each node based, e.g., on a least-cost path from the node in question to the goal node (e.g., $n_{15}$).

In embodiments, other agents $A_j$ are modeled such that each has its own probabilistic behavioral model. For every agent $A_j$, a next motion planning step is given by a probabilistic function $X_j$ of the actions taken by all other agents and the primary agent 102 since time T=0. The probabilistic function $X_j$ may be sampled a number of times k based on such factors as, e.g., standard deviation, variance, and processing cost/time.

Motion planning for the primary agent 102 using the graph 1000 depicted in FIG. 10 may be performed beginning at time T=0, at a node denoted n (e.g., $n_0$). For each agent $A_j$, the system determines which lattice edges, if any, collide with each agent in moving to the node where the primary agent will be at time T=1. The values of the collision edges are modified using a cost function which measures the cost of predicted actual collisions, and which assigns a high value to an edge in collision. Based on the modified edge costs, the value of each candidate node n' (e.g., $n_3$, $n_4$, $n_5$, and $n_1$) is computed. A least-cost path from the current node (e.g., $n_0$) to the goal (e.g., $n_{15}$) is determined through each of the candidate nodes n'.

It is assumed for purposes of planning that the primary agent 102 moves to the minimum valued candidate node n', which in the example depicted in FIG. 10 is node $n_4$. The least-cost path 1010 through node $n_4$ may be, for example, a path passing through nodes $n_4$, $n_8$, $n_{12}$, $n_{16}$, and ending at node $n_{15}$ (i.e., the goal). As explained in further detail below, this is merely a planned path, rather than an actual path of the primary agent 102 in the motion planning graph 1000. In other words, this planned movement does not result in motion instructions being sent to the primary agent 102 by the motion planning system.

The planned, i.e., hypothetical, movement of the primary agent 102 to node $n_4$ affects the paths of the other agents, as determined by probabilistic models. This means that the least-cost path 1010 determined at time T=0, with the primary agent 102 at node no, may no longer be the least-cost path at time T=1. The calculation described above is repeated under the assumption that node $n_4$ is the current node of the primary agent 102 and a new least-cost path 1020 is determined from node $n_4$, e.g., a path passing through nodes $n_9$, $n_{13}$, $n_{16}$, and ending at the goal, node $n_{15}$. The calculation is repeated until the planned route of the primary agent 102 reaches the goal, e.g., node $n_{15}$.

After the planned movement of the primary agent 102 is mapped in this manner, the motion planning graph 1000 will have edges for which costs have been determined based on a planned route which, in turn, is based on the probabilistic functions used to model the other agents in the environment of the primary agent. A candidate node n' having the lowest value (i.e., cost) is determined and the primary agent 102 moves from the current node no to the candidate node n' (e.g., $n_3$, $n_4$, $n_5$, or $n_1$). Following this actual move of the primary agent 102 in the motion planning graph 1000, the process described above is repeated from the new current node n (e.g., $n_3$, $n_4$, $n_5$, or $n_1$) at the next time step, T=T+1.

Figure 11A:
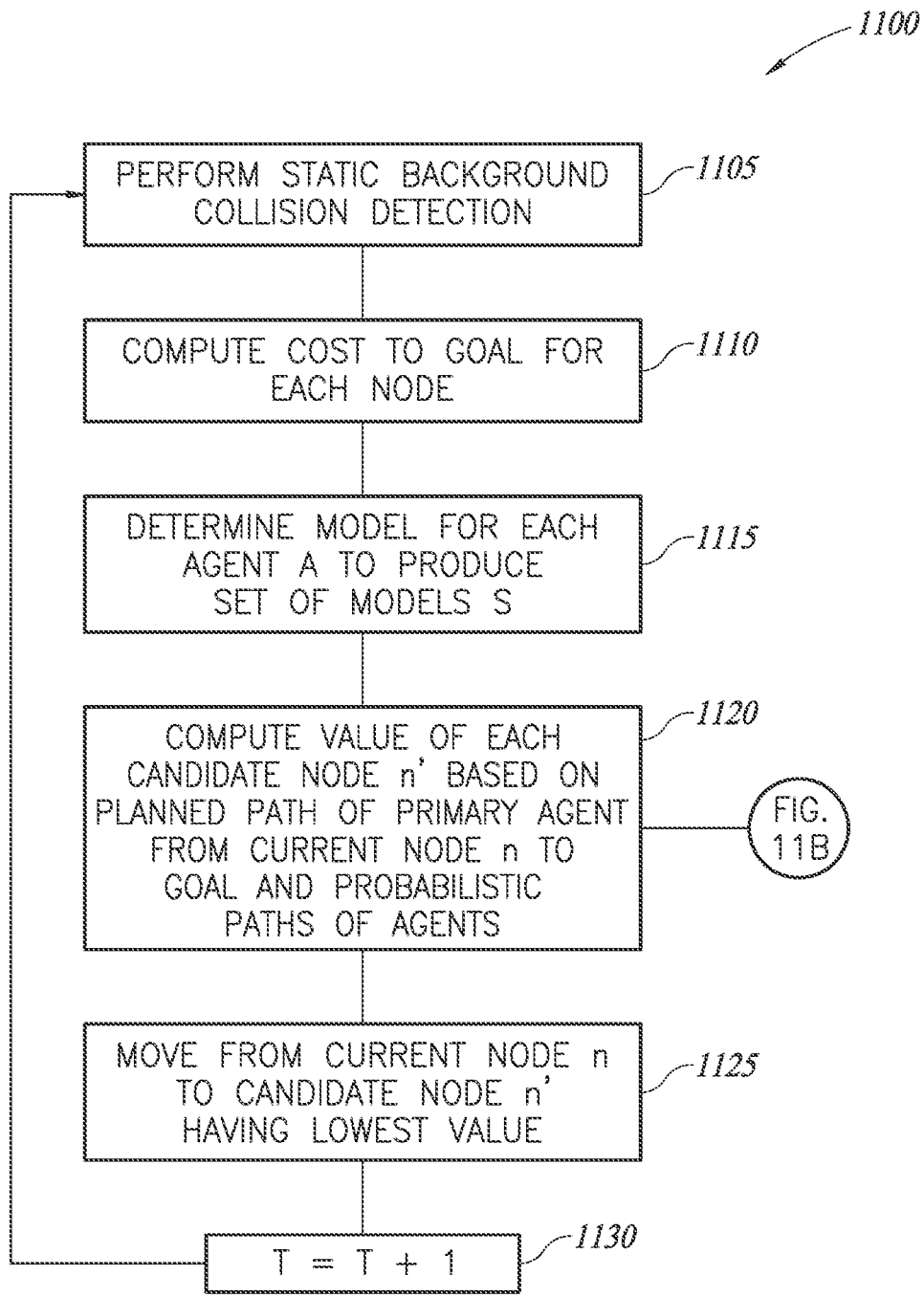
FIG. 11A is a flow diagram showing a method to identify paths for a primary agent via planning graphs, the paths passing through a candidate node having a lowest average cost taking into account a planned path of the primary agent to the goal and the paths of other agents determined using probabilistic models, according to one illustrated embodiment.

FIG. 11A is a flow diagram showing a method 1100 to identify paths for a primary agent 102 via planning graphs, the paths passing through a candidate node having a lowest average cost taking into account a planned path of the primary agent 102 to the goal and the probabilistically-determined paths of other agents, according to one illustrated embodiment. At 1105, the system performs static background collision detection, as described above. At 1110, the cost to the goal for each node of the motion planning graph 1000 is computed. At 1115, the system determines a probabilistic model of next steps $X_j$ for each agent $A_j$ to produce a set of models S. At 1120, the system computes a value for each candidate node n' based on a planned path of the primary agent 102 from a current node n to the goal and the probabilistically-determined paths of the other agents, as further explained in FIG. 11B and its corresponding description below. At 1125, the primary agent 102 moves from its current node n to candidate node n' having the lowest value (i.e., cost). At 1130, the method 1100 is repeated for the next time step, T=T+1.

Figure 11B:
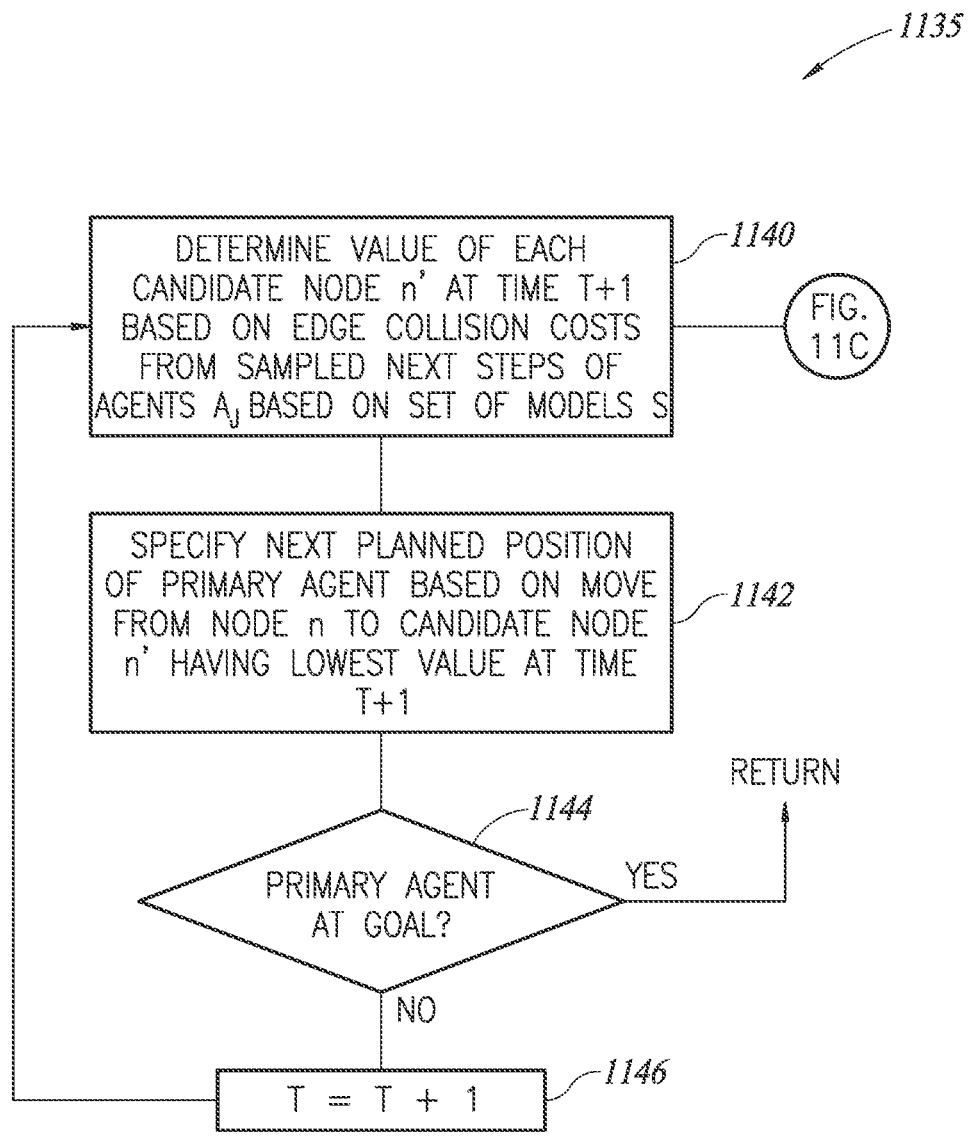
FIG. 11B is a flow diagram showing a method, useful in the method of FIG. 11A, to compute the value of each candidate node based on a planned path of the primary agent to the goal and the paths of other agents determined from the probabilistic models, according to one illustrated embodiment.

FIG. 11B is a flow diagram showing a method 1135, useful in the method 1100 of FIG. 11A (block 1120), to compute the value of each candidate node based on a planned path of the primary agent 102 to the goal and the probabilistically-determined paths of other agents, according to one illustrated embodiment. At 1140, the system determines the value of each candidate node n' based on sampled next steps $X_j$ of other agents $A_j$ based on a set of models S, as further explained in FIG. 11C and its corresponding description below. At 1142, the system specifies the next planned position of the primary agent 102 based on a move from the current node no to a candidate node n' having the lowest value at time T+1. At 1144, if the primary agent 102 is not yet at the goal node, then the time is incremented (at 1146) and the method 1135 is repeated for the next time step. If the primary agent 102 is at the goal node, then processing returns to method 1100 (following block 1120).

Figure 11C:
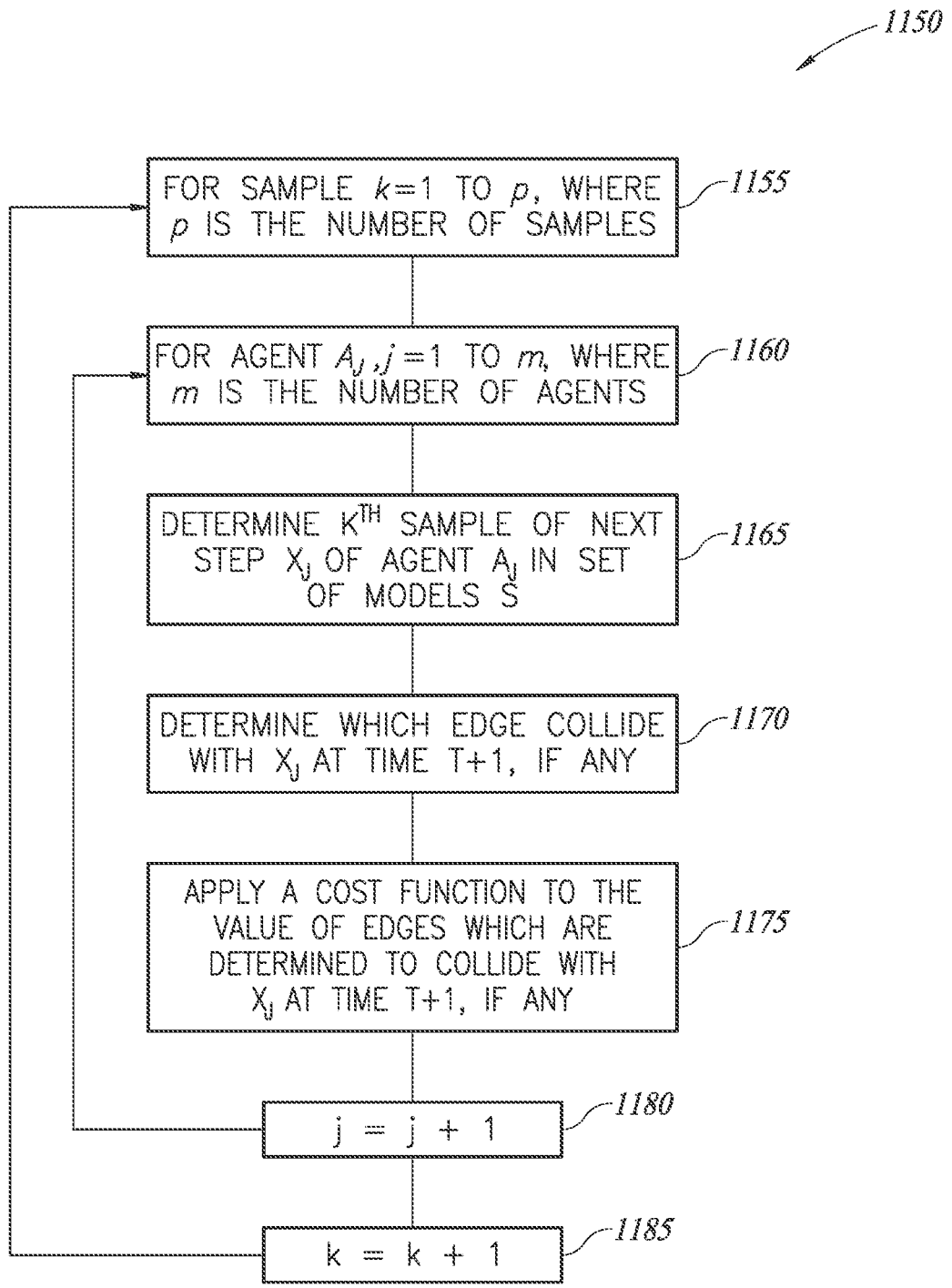
FIG. 11C is a flow diagram showing a method, useful in the method of FIG. 11B, to determine the value of each candidate node at a next time step based on edge collision costs from sampled next steps of other agents based on the probabilistic models, according to one illustrated embodiment.

FIG. 11C is a flow diagram showing a method 1150, useful in the method 1135 of FIG. 11B (block 1140), to determine the value of each candidate node n' at a next time step, T+1, based on edge collision costs from sampled next steps $X_j$ of other agents $A_j$ based on a set of probabilistic models 5, according to one illustrated embodiment. At 1155, an iterative loop is initiated based on the number of samples per agent, p. At 1160, an iterative loop is initiated based on the number of other agents, j. At 1165, the system determines the $k^{th}$ sample of the probabilistic next step $X_j$ of an agent $A_j$, based on the set of models S. at 1170, the system determines which edges of the motion planning graph 1000, if any, collide with the determined probabilistic next step $X_j$ of the agent $A_j$ at time T+1. At 1175, system applies a cost function to the value of edges, if any, which are determined to collide with the probabilistic next step $X_j$ of agent $A_j$ at time T+1. At 1180, the iterative loop for the other agents repeats until all of the other agents have been processed. At 1185, after the iterative loop for the other agents has been completed j times, the iterative loop for samples repeats until all of the samples have been completed, i.e., k times.

As explained above, in implementations, the probabilistic behavioral models of the agents $A_j$ are interdependent, in that the trajectory of each agent $A_j$ is dependent upon the trajectories of all other agents and the primary agent. Therefore, the current and past positions of all of the agents $A_j$ and the primary agent are provided as inputs to the probabilistic behavioral models to determine the predicted next step $X_j$ of each of the agents $A_j$. In doing so, there typically will be some limit on the window or history or look back. Accordingly, the innermost loop of the process (depicted in FIG. 11C) is the loop to determine the predicted next step $X_j$ of all of the agents $A_j$ before sampling is repeated. In this way, all of the samples are performed based on the same current position of all of the agents $A_j$ and the primary agent.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, CD ROMs and computer memory.

The various embodiments described above can be combined to provide further embodiments. All of the commonly assigned US patent application publications, US patent applications, foreign patents, and foreign patent applications referred to in this specification and/or listed in the Application Data Sheet, including but not limited U.S. Patent Application Ser. No. 62/775,257 filed Dec. 4, 2018 entitled "APPARATUS, METHOD, AND ARTICLE TO FACILITATE MOTION PLANNING IN AN ENVIRONMENT HAVING DYNAMIC OBJECTS"; U.S. Patent Application Ser. No. 62/616,783 filed Jan. 12, 2018 entitled "APPARATUS, METHOD, AND ARTICLE TO FACILITATE MOTION PLANNING OF AN AUTONOMOUS VEHICLE IN AN ENVIRONMENT HAVING DYNAMIC OBJECTS"; International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," and International Patent Application Publication No. WO 016/122840, filed Jan. 5, 2016, entitled "SPECIALIZED ROBOT MOTION PLANNING HARDWARE AND METHODS OF MAKING AND USING SAME" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A motion planning method of operation in a processor-based system to perform motion planning via planning graphs, where each planning graph respectively comprises a plurality of nodes and edges, each node which represents, implicitly or explicitly, time and variables that characterize a state of a primary agent, which operates in an environment that includes one or more other agents, and each edge represents a transition between a respective pair of the nodes, the method comprising:
   for a current node in a first planning graph,
      for each trajectory in a set of trajectories that respectively represent actual or prospective trajectories of at least one of the one or more other agents,
         determining which edges of the first planning graph collide with the respective trajectory, if any of the edges collide with the respective trajectory;
         applying a cost function to one or more of the respective edges to reflect at least one of a determined collision or absence thereof; and
         for each of a number of candidate nodes in the first planning graph, the candidate nodes being any node in the first planning graph that is directly coupled to the current node in the first planning graph by a respective single edge of the first planning graph, finding a least cost path from the current node to a goal node in the first planning graph that passes from the current node directly to the respective candidate node and then to the goal node, with or without a number of intervening nodes successively between the respective candidate node and the goal node along a corresponding path; and
      after finding the least cost path for each of the candidate nodes with respect to the trajectories of the set of trajectories,
         for each of the candidate nodes, computing a respective value based at least in part on a respective cost associated with each least cost path for the respective candidate node across all of the trajectories; and
         selecting one of the candidate nodes based at least in part on the computed respective values.

2. The motion planning method of claim 1 wherein applying a cost function to one or more of the respective edges to reflect at least one of the determined collision or absence thereof includes:
   for any of the edges that are determined to collide with at least one trajectory, increasing a cost of the respective edge to a relatively high magnitude to reflect the determined collision, wherein the relatively high magnitude is relatively higher than a relatively low magnitude that reflects an absence of collision for at least one other edge.

3. The motion planning method of claim 1 wherein applying a cost function to one or more of the respective edges to reflect at least one of the determined collision or absence thereof includes:
   for any of the edges that are determined not to collide with at least one trajectory, increasing a cost of the respective edge to a relatively high magnitude to reflect the determined absence of collision, wherein the relatively high magnitude is relatively higher than a relatively low magnitude that reflects a collision for at least one other edge.

4. The motion planning method of claim 1, further comprising:
   for each of at least one of the other agents in the environment, sampling to determine the respective prospective trajectory of the other agent; and
   forming the set of trajectories from the determined respective actual or prospective trajectory of each of the other agents.

5. The motion planning method of claim 1, further comprising:
selecting the candidate nodes in the first planning graph from the other nodes of the first planning graph based on the candidate nodes being any node in the first planning graph that is directly coupled to the current node in the first planning graph by a respective single edge of the first planning graph.

6. The motion planning method of claim 1 wherein computing a respective value based at least in part on a respective cost associated with each least cost path for the respective candidate node across all of the trajectories, includes computing an average value of the respective cost associated with each least cost path that extends from the current node to the goal node via the respective candidate node and via all of the intervening nodes, if any.

7. The motion planning method of claim 1 wherein selecting one of the candidate nodes based at least in part on the computed respective values includes selecting the one of the candidate nodes which has the respective computed value that is a smallest of all of the computed values.

8. The motion planning method of claim 1, further comprising: updating a trajectory of the primary agent based on the selected one of the candidate nodes.

9. The method of claim 1, further comprising:
initializing the first planning graph before applying the cost function to the respective edges to reflect the determined collisions.

10. The method of claim 9 wherein initializing the first planning graph includes:
for each edge in the first planning graph performing a collision assessment for the edge relative to each of a number of static objects in the environment to identify collisions, if any, between the respective edge and the static objects.

11. The method of claim 10 wherein initializing the first planning graph further includes:
for each edge that is assessed as colliding with at least one of the static objects, applying a cost function to the respective edge to reflect the assessed collision or removing the edge from the first planning graph.

12. The method of claim 9 wherein initializing the first planning graph further includes:
for each node in the first planning graph, computing a cost to the goal node from the node; and
logically associating the computed cost with the respective node.

13. The method of claim 1, further comprising:
assigning the selected one of the candidate nodes to be a new current node in the first planning graph;
for the new current node in a first planning graph,
for each trajectory in a set of trajectories that respectively represent actual or prospective trajectories of at least one of the one or more other agents,
determining which edges of the first planning graph collide with the respective trajectory, if any of the edges collide with the respective trajectory;
applying a cost function to one or more of the respective edges to reflect at least one of the determined collision or absence thereof; and
for each of a number of new candidate nodes in the first planning graph, the new candidate nodes being any node in the first planning graph that is directly coupled to the new current node in the first planning graph by a respective single edge of the first planning graph, finding a least cost path from the new current node to a goal node in the first planning graph that passes from the new current node directly to the respective new candidate node and then to the goal node, with or without a number of intervening nodes successively between the respective new candidate node and the goal node along a corresponding path; and
after finding the least cost path for each of the new candidate nodes with respect to the trajectories of the set of trajectories,
for each of the new candidate nodes, computing a respective value based at least in part on a respective cost associated with each least cost path for the respective new candidate node across all of the trajectories; and
selecting one of the new candidate nodes based at least in part on the computed respective values.

14. A processor-based system to perform motion planning via planning graphs, where each planning graph respectively comprises a plurality of nodes and edges, each node which represents, implicitly or explicitly, time and variables that characterize a state of a primary agent, which operates in an environment that includes one or more other agents, and each edge represents a transition between a respective pair of the nodes, the system comprising:
at least one processor; and
at least one nontransitory processor-readable medium that stores at least one of processor-executable instructions or data which, when executed by the at least one processor, causes the at least one processor to:
for a current node in a first planning graph,
for each trajectory in a set of trajectories that respectively represent actual or prospective trajectories of at least one of the one or more other agents,
determine which edges of the first planning graph collide with the respective trajectory, if any of the edges collide with the respective trajectory;
apply a cost function to one or more of the respective edges to reflect at least one of a determined collision or absence thereof; and
for each of a number of candidate nodes in the first planning graph, the candidate nodes being any node in the first planning graph that is directly coupled to the current node in the first planning graph by a respective single edge of the first planning graph, find a least cost path from the current node to a goal node in the first planning graph that passes from the current node directly to the respective candidate node and then to the goal node, with or without a number of intervening nodes successively between the respective candidate node and the goal node along a corresponding path; and
after finding the least cost path for each of the candidate nodes with respect to the trajectories of the set of trajectories,
for each of the candidate nodes, compute a respective value that represents an average value of a respective cost associated with each least cost path for the respective candidate node across all of the trajectories; and
select one of the candidate nodes based at least in part on the computed respective values.

15. A method of operation in a motion planning system that employs graphs with nodes that represent states and edges that represent transitions between states, the method comprising:

for each available next node with respect to a current node in a first graph, calculating, via at least one processor, a respective associated representative cost to reach a goal node from the current node via the respective next node, the respective associated representative cost which reflects a respective representative cost associated with each available path from the current node to the goal node via the respective next node in light of an assessment of a probability of collision with one or more agents in an environment based on a nondeterministic behavior of each of the one or more agents in the environment, the agents which can vary any one or more of a position, a velocity, a trajectory, a path of travel, or a shape over time;

selecting, via at least one processor, a next node based on the calculated respective associated representative costs for each available next node; and commanding, via at least one processor, a movement of a primary agent based at least in part on the selected next node, wherein calculating a respective associated representative cost to reach a goal node from the current node via the respective next node, comprises:

for each prospective path between the current node and the goal node via the respective next node,
for each edge between the current node and the goal node along the respective prospective path,
determining a respective associated representative cost; and
assigning the determined respective associated representative cost for each edge to the respective edge for each edge between the current node and the goal node along the respective prospective path;

determining a least cost path for the respective next node from the respective prospective paths between the current node and the goal node via the respective next node based at least on part on the assigned determined respective associated representative costs; and assigning a value representative of the determined least cost path to the respective next node.

16. The method of claim 15 wherein determining a least cost path for the respective next node from the respective prospective paths between the current node and the goal node via the respective next node based at least on part on the assigned determined respective associated representative costs comprises determining a least cost path that includes a cost of traversing from the current node to the respective next node.

17. The method of claim 16 wherein determining a respective associated representative cost for each edge between the current node and the goal node along the respective prospective path, comprises:

for each edge between the current goal and the goal node along the respective prospective path,
assessing a risk of a collision with one or more agents in the environment based on one or more probabilistic functions that respectively represent the nondeterministic behavior of each of the one or more agents in the environment.

18. The method of claim 17 wherein assessing a risk of a collision with one or more agents in the environment based on one or more probabilistic functions that respectively represent the nondeterministic behavior of each of the one or more agents in the environment comprises:

sampling the probabilistic functions that respectively represent the nondeterministic behavior of each of the one or more agents in the environment in light of a series of actions represented by respective ones of each edge between the respective next node and each successive node along the respective prospective path.

19. The method of claim 17 wherein assessing a risk of a collision with one or more agents in the environment based on one or more probabilistic functions that respectively represent the nondeterministic behavior of each of the one or more agents in the environment comprises:

sampling the probabilistic functions that respectively represent the nondeterministic behavior of each of the one or more agents in the environment in light of a series of actions represented by respective ones of each edge between the respective next node and each successive node along the respective prospective path to a present node, the present node being a further node along the respective prospective path reached during the assessing of the risk of collision.

20. The method of claim 17 wherein assessing a risk of a collision with one or more agents in the environment based on one or more probabilistic functions that respectively represent the nondeterministic behavior of each of the one or more agents in the environment comprises:

for each of the agents, repeatedly sampling the respective probabilistic function that respectively represents the nondeterministic behavior of the respective agent.

21. The method of claim 20 wherein the repeatedly sampling the respective probabilistic function that respectively represents the nondeterministic behavior of the respective agent includes repeatedly sampling the respective probabilistic function for a plurality of iterations, a total number of the iterations based at least in part on an available amount of time before the commanding must occur.

22. The method of claim 17 wherein assessing a risk of a collision with one or more agents in the environment based on one or more probabilistic functions that respectively represent the nondeterministic behavior of each of the one or more agents in the environment comprises:

for each of the agents, repeatedly sampling the probabilistic functions that respectively represent the nondeterministic behavior of each of the one or more agents in the environment in light of a series of actions represented by respective ones of each edge between the respective next node and each successive node along the respective prospective path.

23. The method of claim 17 wherein assessing a risk of a collision with one or more agents in the environment based on one or more probabilistic functions that respectively represent the nondeterministic behavior of each of the one or more agents in the environment comprises:

for each of the agents, repeatedly sampling the probabilistic functions that respectively represent the nondeterministic behavior of each of the one or more agents in the environment in light of a series of actions represented by respective ones of each edge between the respective next node and each successive node along the respective prospective path to a present node, the present node being a further node along the respective prospective path reached during the assessing of the risk of collision.

24. The method of claim 17 wherein the assessing of the risk of collision involves simulation of traversal of the respective prospective paths.

25. The method of claim 17 wherein assessing a risk of a collision with one or more agents in the environment based on one or more probabilistic functions that respectively represent the nondeterministic behavior of each of the one or more agents in the environment comprises:
    assessing a risk of collision via dedicated risk assessment hardware based at least on a probabilistically determined respective trajectory of each of the one or more agents in the environment, where the respective associated representative costs are based at least in part on the assessed risk of collision.

26. The method of claim 17 wherein assessing a risk of a collision with one or more agents in the environment based on one or more probabilistic functions that respectively represent the nondeterministic behavior of each of the one or more agents in the environment comprises: assessing a risk of a collision with one or more agents in the environment based on one or more probabilistic functions that respectively represent the nondeterministic behavior of at least a secondary one of the agents in the environment, the primary one of the agents being an agent for which the motion planning is being performed.

27. The method of claim 15, further comprising:
    initializing the first graph before calculating a respective associated representative cost to reach a goal node from the current node via the respective next node.

28. The method of claim 27 wherein initializing the first graph, comprises:
    performing a static collision assessment to identify any collisions with one or more static objects in the environment;
    for each node in the first graph, computing a respective cost to reach a goal node from the respective node; and
    for each node in the first graph, logically associating the respective computed cost to reach a goal node with the respective node.

29. A processor-based system to perform motion planning that employs graphs with nodes that represent states and edges that represent transitions between states, the system comprising:
    at least one processor; and
    at least one nontransitory processor-readable medium that stores at least one of processor-executable instructions or data which, when executed by the at least one processor, causes the at least one processor to:
        for each available next node with respect to a current node of a primary agent for which the motion planning is being performed in a first graph, calculate a respective associated representative cost to reach a goal node from the current node via the respective next node, the respective associated representative cost which reflects a respective representative cost associated with each available path from the current node to the goal node via the respective next node in light of an assessment of a probability of collision of the primary agent with one or more other agents in an environment based on a nondeterministic behavior of each of the one or more other agents in the environment, the nondeterministic behavior comprising varying any one or more of a position, a velocity, a trajectory, a path of travel, or a shape over time;
    select a next node based on the calculated respective associated representative costs for each available next node; and
    command a movement of the primary agent based at least in part on the selected next node, wherein to calculate a respective associated representative cost to reach a goal node from the current node via the respective next node, the at least one processor:
    for a set of the edges comprising at least the edges between the current node and the goal node along any prospective path,
        determines a respective associated representative cost of each of the edges;
        assigns the determined respective associated representative cost for each edge to the respective edge in the set of edges;
        determines a least cost path for the respective next node from the respective prospective paths between the current node and the goal node via the respective next node based at least on part on the assigned determined respective associated representative costs; and
        assigns a value representative of the determined least cost path to the respective next node.

* * * * *